United States Patent [19]
Nisioka

[11] Patent Number: 4,662,725
[45] Date of Patent: May 5, 1987

[54] OBJECTIVE LENS SYSTEM FOR ENDOSCOPES

[75] Inventor: Kimihiko Nisioka, Tokyo, Japan
[73] Assignee: Olympus Optical Co., Ltd., Tokyo, Japan
[21] Appl. No.: 701,039
[22] Filed: Feb. 12, 1985
[30] Foreign Application Priority Data Feb. 15, 1984 [JP] Japan .................. 59-25183

[51] Int. Cl.$^4$ .......... G02B 9/34; G02B 9/62; G02B 9/64; G02B 13/18
[52] U.S. Cl. ..................... 350/432
[58] Field of Search ......................... 350/432

[56] References Cited

U.S. PATENT DOCUMENTS 4,059,344 11/1977 Yamasita .
4,300,817 11/1981 Betensky ................ 350/432
4,400,064 8/1983 Ikemori et al. ................. 350/432

FOREIGN PATENT DOCUMENTS 49-121547 11/1974 Japan .
57-173810 10/1982 Japan .

Primary Examiner—John K. Corbin
Assistant Examiner—Rebecca D. Gass
Attorney, Agent, or Firm—Cushman, Darby & Cushman

[57] ABSTRACT

An objective lens system for endoscopes having favorably corrected distortion. Said lens system comprising a front lens group having negative refractive power and a rear lens group having positive refractive power, arranged in said front lens group is a lens component having an aspherical surface having portions whose curvature is increased as they are farther from the optical axis or decreases as they are farther from the optical axis.

21 Claims, 29 Drawing Figures

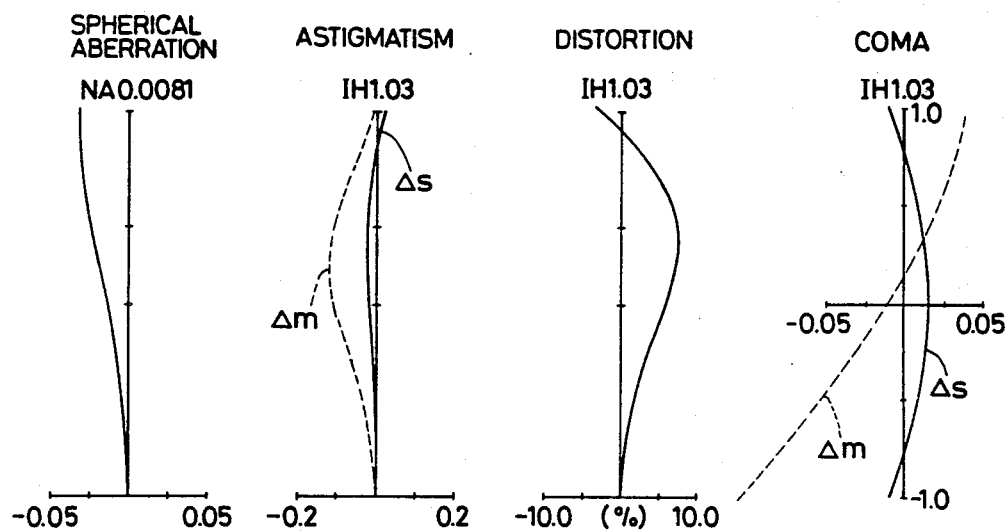

OBJECTIVE LENS SYSTEM FOR ENDOSCOPES

BACKGROUND OF THE INVENTION (a) Field of the Invention

The present invention relates to an objective lens system for endoscopes using optical fiber bundles or relay lenses as an image transmission optical system, and more specifically to an objective lens system having favourably corrected distortion.

(b) Description of the Prior Art

As the conventional objective lens systems for endoscopes of the retrofocus type as shown in FIG. 1, there has already been known, for example, the one disclosed by Japanese published unexamined patent application No. 121547/74.

This objective lens system for endoscopes of retrofocus type comprises a lens group I having negative refractive power and a rear lens group II having positive refractive power which are arranged on the object side and image side respectively with a stop S interposed therebetween. This objective lens system is so designed as to obtain a wide angle by strongly refracting the principal ray P with the negative lens group I arranged before the stop S. Further, the positive lens group II arranged after the stop S functions to make the principal ray P incident on the image surface in parallel with the optical axis.

The objective lens system is so designed as to minimize loss of light in the image guide G by making the principal ray P emerging from the objective lens incident perpendicularly on the end surface of the image guide G.

When the objective lens system of this type is to be applied to an endoscope equipped with relay lenses, the principal ray P is made perpendicular to the image surface O' as shown in FIG. 2 to minimize loss of rays in the relay lenses R.

The conventional objective lens system for endoscopes of retrofocus type satisfies two requirements for an objective lens system for endoscopes, i.e., a wide angle and perpendicular incidence of the principal ray on the image surface. However, there still remains a defect that negative distortion is remarkable in the objective lens system for endoscopes.

In the objective lens system for endoscopes shown in FIG. 1, for example, distortion is $-21\%$ at $\omega = 37°$ ($2\omega$ = angle of view). In addition, negative distortion is remarkable in the other conventional objective lens systems of retrofocus type as is seen from the relationship between angle of view and distortion listed in Table 1:

TABLE 1

| $\omega$ | 20° | 30° | 40° | 50° | 60° |
|---|---|---|---|---|---|
| Distortion | $-6\%$ | $-13.5\%$ | $-23\%$ | $-36\%$ | $-50\%$ |

In order to correct the negative distortion, it is contrived to arrange an aspherical surface in the objective lens system. As an example of objective lens systems having distortion nd other aberrations corrected with an aspherical surface, there have been known the one disclosed by Japanese published unexamined patent application No. 173810/82. However, distortion is not corrected sufficiently in this objective lens system though it has a narrow angle of view ($2\omega$) of 56°.

SUMMARY OF THE INVENTION

A general object of the present invention is to provide a wide-angle objective lens system for endoscopes comprising a negative front lens group and a positive rear lens group, and having distortion minimized by arranging at least one lens component having aspherical surface in said negative front lens group.

The objective lens system for endoscopes according to the present invention has the composition, for example, shown in FIG. 3. Speaking concretely, the objective lens system according to the present invention comprises a lens group I (front lens group) having negative refractive power, a lens group II (rear lens group) having positive refractive power and a stop S arranged in the vicinity of the front focal point of said lens group II. One of the lens components arranged in said front lens group I has an object side surface (for example, the surface $R_1$ shown in FIG. 3) which is designed as an aspherical surface having portions whose curvature gradually increases as they are farther from the optical axis. Alternately, the objective lens system for endoscopes according to the present invention has the composition shown in FIG. 4, and comprises a negative front lens group I, a positive rear lens group II and a stop S arranged in the vicinity of the front focal point of said lens group II, one of the lens components arranged in said front lens group I having portions whose curvature gradually decreases as they are farther from the optical axis. The aspherical surfaces of these lenses are symmetrical with regard to the optical axis, like the other types of lenses.

The objective lens system for endoscopes according to the present invention is so designed as to correct negative distortion sufficiently by arranging the aspherical surface having the shape described above.

The negative distortion can be corrected by arranging the aspherical surface having above-described shape for the reason described below:

As reverse tracing of the principal ray from the image side clarifies, the conventional objective lens system for endoscopes having the composition shown in FIG. 1 produces remarkable negative distortion because the principal ray is refracted, as image height increases, in such a direction as to widen angle of view by the front and rear lens groups I and II which are arranged before and after the stop S.

Therefore, it is possible to correct the remarkable negative distortion by arranging a lens component having a surface including at least an aspherical surface including portions whose refractive power for the principal ray is continuously weakened as they are it is farther from the opical axis.

It is therefore sufficient to design one of the lens components in the front lens group I arranged before the stop S so as to have an object side surface having portions whose curvature is gradually increased as they are farther from the optical axis as shown in FIG. 3, or one of the lens components in the front lens group I so as to have an image side surface having portions whose curvature is gradually decreased as they are farther from the optical axis as shown in FIG. 4.

The above mentioned surface having portions whose curvature is gradually increased as they are farther from the optical axis can include the aspherical surfaces having shapes shown in FIG. 5 and FIG. 6. "Curvature" used herein should be interpreted as a term including positive or negative sign. Speaking concretely, curvature at a point should be considered as negative when center of curvature of a spherical surface in contact with the lens surface at an optional point on said lens surface is located on the object side or positive when the center of curvature is located on the image side. Accordingly, the aspherical surface shown in FIG. 5 is an example having curvature increasing as it is farther from the optical axis (increasing from negative curvature of concavity on the object side to positive curvature of convexity on the object side), whereas the aspherical surface shown in FIG. 6 is an example having curvature increasing and then decreasing as it is farther from the optical axis.

The aspherical surface shown in FIG. 6 is also effective to correct the distortion because undulation of distortion curve as shown in FIG. 7 poses no practical problem and because the peripherical portions of the aspherical surface shown in FIG. 6 has no relation to correction of distortion since the lower ray passes through the peripherical portions but the principal ray does not.

The aspherical surface having portions whose curvature is decreased as they are farther from the optical axis includes the examples shown in FIG. 8 and FIG. 9.

The aspherical surface arranged in the objective lens system for endoscopes according to the present invention is, when it is designed as an object side surface of a lens component, a surface having curvature gradually increasing at least on its portions including the surfaces shown in FIG. 5 and FIG. 6. When the aspherical surface is designed as an image side surface of a lens component, it is a surface having curvature gradually decreasing at least on its portions including the surfaces shown in FIG. 8 and FIG. 9. A lens system including at least one aspherical surface of this type can correct distortion favourably.

Now, shape of the aspherical surface required for correcting distortion will be described quantitatively.

An aspherical surface can generally be expressed by the following formula (1):

$$x = \frac{Cy^2}{1 + \sqrt{1 - PC^2y^2}} + By^2 + Ey^4 + Fy^6 + Gy^8 + \ldots \quad (1)$$

wherein the reference symbols x and y represent values on coordinates on which the optical axis is traced as x axis taking the image direction as positive and y axis is traced perpendicularly to the x axis taking the intersect between the aspherical surface and optical axis as origin O, the reference symbol C designates a curvature of a spherical surface in contact with the aspherical surface in the vicinity of the optical axis, reference symbol P denotes a parameter representing shape of the aspherical surface, and the reference symbols E, F, G, . . . represent the second power, fourth power, sixth power, eighth power aspherical surface coefficients respectively.

Now, let us consider a circle which is in contact on the optical axis with the aspherical surface expressed by the formula (1). A spherical surface having C as an inverse number of its radius is generally expressed by the following formula:

$$x = \frac{Cy^2}{1 + \sqrt{1 - C^2y^2}}$$

In case of $C \neq 0$ and $B = 0$ in the formula (1), the spherical surface in contact on the optical axis with the aspherical surface can be expressed by the following formula (2):

$$x_s = \frac{Cy^2}{1 + \sqrt{1 - C^2y^2}} \quad (2)$$

In case of $C=0$ in the formula (1), the spherical surface in contact on the optical surface with the aspherical surface can be expressed by the following formula (3):

$$x_s = \frac{2By^2}{1 + \sqrt{1 - 4B^2y^2}} \quad (3)$$

Distortion is corrected by properly adjusting difference $\Delta$ between the aspherical surface expressed by the formula (1) and the spherical surface expressed by the formula (2) or (3). That is to say, distortion is corrected by properly adjusting $\Delta$ expressed by the following formula (4):

$$\Delta = x - x_s \quad (4)$$

Speaking more strictly, distortion is corrected by properly adjusting deflection angle K of the principal ray caused by $\Delta$, i.e., K given by the following formula (5):

$$K = \left\{ (n - 1) \frac{d\Delta}{dy} \right\}_{y=y_c} \quad (5)$$

wherein the reference symbol n represents refractive index of the constituent substance of the aspherical surface lens component and the reference symbol $y_c$ designates height of the principal ray having the maximum image height on the aspherical surface. $y_c$ is smaller than 0 at a point before the stop.

Now, let us define correcting ratio of distortion as expressed by the following formula (6):

$$H = \frac{D - D_s}{-D_s} \quad (6)$$

In this formula (6), the reference symbol D represents distortion remaining in a lens system whose distortion is corrected with an aspherical surface and the reference symbol $D_s$ designates distortion in the same lens system composed only of spherical surface lens components without using an aspherical surface. $D_s$ can be determined, for example, directly or by interpolation from the Table 1 summarizing the data on the conventional examples.

According to the aberration theory, it is already known that distortion increases in proportion to cube of the angle $\omega$ ($2\omega$=angle of view) of objective lens system. Hence, the above-mentioned deflection angle K of the principal ray produced by aspherical surface is approximately expressed by the following formula (7):

$$K = A \cdot \omega^3 \cdot H \cdot \sigma \quad (7)$$

wherein the reference symbol A represents a proportional constant which is variable depending on degree of distortion correctable with lens surfaces other than the aspherical surface. A has a small value when distortion is corrected to a high degree with lens surfaces other than the aspherical surface, and vice versa. Further, when the principal ray P incident on the image surface forms a negative angle $\theta$ deviating from 0° with the image surface as shown in FIG. 11, A has a value smaller than its value at $\theta = 0$. In addition, let us assume that $\sigma$ has a value of $-1$ when the aspherical surface is arranged on the object side of a lens component, or a value of 1 when the aspherical surface is arranged on the image side of a lens component. Moreover, let us assume that $\omega$ has a value within a range of $\omega > 0$ expressed in unit of degree.

When a plural number N of aspherical surfaces are arranged within an objective lens system, K has a value equal to total of values on the respective surfaces. That is, K is expressed by the following formula (8):

$$K = \sum_{i=1}^{N} k_i \qquad (8)$$

In case of C=0 in the formula (5), the square root in the formula (1) or (2) has a negative value when value of $y_c$ exceeds radius of contact circle $R = 1/C$, i.e., in a range of $y_c \geq R$. In such a case, let us select a value of $y_c$ within the range defined below and calculate H by using the formula (6) at the angle $\omega$ corresponding to the value of $y_c$:

$$0.6R < y_c < 0.75R$$

In the foregoing descriptions, A should desirably have a value within the range defined below when other aberrations, etc. are taken into consideration:

$$A < 10^{-5} \qquad (9)$$

If the limit is exceeded, the meridional image plane will be undercorrected, thereby resulting in undesirable effect to produce remarkable astigmatic difference.

The upper limit of value of A is variable depending also on F number of lens systems. When image quality is taken into consideration, upper limit of value of A for an optional F number is defined as follows:

$$A < \frac{4 \times 10^{-5}}{F_{NO}} \qquad (10)$$

Therefore, it is possible to obtain an objective lens system for endoscopes having little distortion and excellent imaging performance by determining shape of aspherical surface so as to satisfy the formula (10).

In addition, an objective lens system which is a little low in its imaging performance but has favourably corrected distortion may be desired for practical use. When this point is taken into consideration, the range defined by the formula (10) can be widened to that expressed by the following formula (11):

$$A < \frac{3.5 \times 10^{-4}}{F_{NO}} \qquad (11)$$

Further, curvature of field produced by a single lens surface is generally proportional to square of height of ray, whereas distortion is proportional to cube of height of ray. Therefore, higher ray is more desirable to correct distortion only without varying curvature of field. For this reason, it is desirable to design a lens surface having a high transmitting section for the principal ray, for example, the first object side surface in the lens system shown in FIG. 3, as an aspherical surface. That is to say, an objective lens system having high imaging performance can be obtained by designing the first object side surface so as to satisfy the formula (11).

As is understood from the foregoing descriptions, it is possible to determine a shape of aspherical surface capable of favourably correcting distortion without affecting the other aberrations by selecting value of A within the range defined by the formula (11).

As a process to manufacture a lens component having the aspherical surface described above, molding of plastic or glass material is advantageous from the viewpoint of manufacturing cost.

The objective lens system is usable not only with endoscopes using optical fiber bundles and relay lenses for transmitting images but also with endoscopes using solid state image pick-up device. When the objective lens system is designed for use with endoscopes using solid state image pick-up device, A has a small value since $\theta$ is not equal to 0 and may be smaller than 0. However, formula (9) and formula (10) are still satisfied in such a case.

BRIEF DESCRIPTION OF THE DRAWINGS

FIG. 21 through FIG. 29 show curves illustrating aberration characteristics of said Embodiments 1 through 9.

DETAILED DESCRIPTION OF THE PREFERRED EMBODIMENTS

Figure 1:
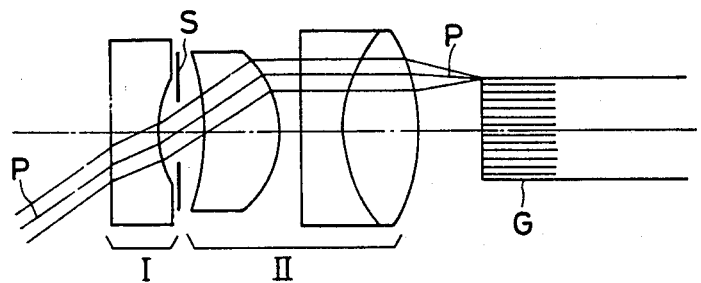
FIG. 1 and FIG. 2 show sectional views illustrating the compositions of the conventional objective lens systems for endoscopes.
Figure 2:
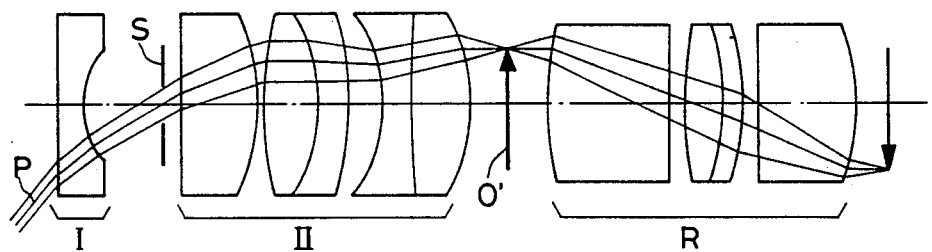
Figure 3:
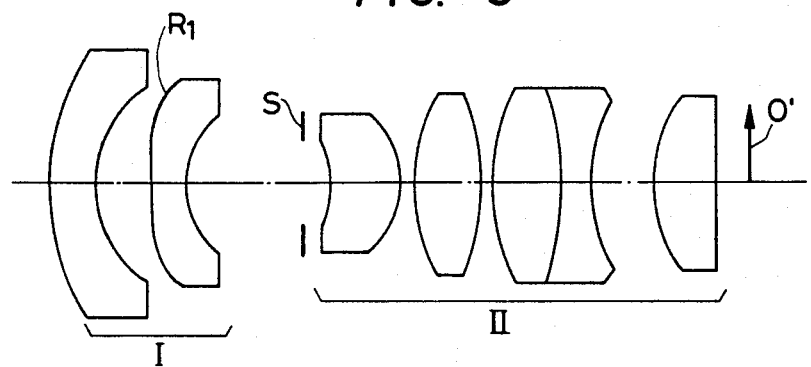
FIG. 3 and FIG. 4 show sectional views illustrating compositions of the objective lens system for endoscopes according to the present invention.
Figure 4:
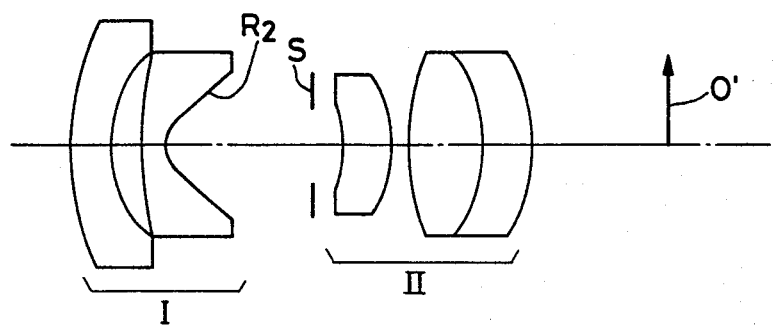
Figure 5:
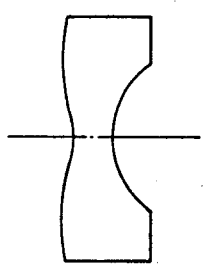
FIG. 5 and FIG. 6 show sectional views of lens components having aspherical surfaces to be used in the objective lens system according to the present invention.
Figure 6:
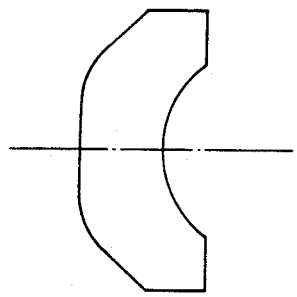
Figure 7:
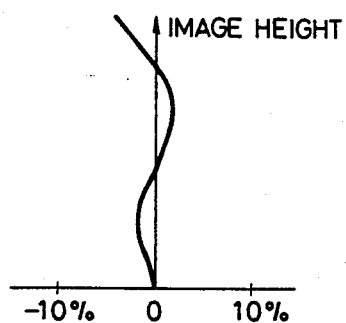
FIG. 7 shows a curve exemplifying correcting condition of distortion.
Figure 8:
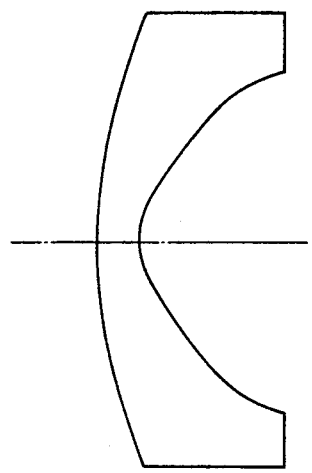
FIG. 8 and FIG. 9 show sectional views illustrating other examples of aspherical surfaces to be used in the objective lens system according to the present invention.
Figure 9:
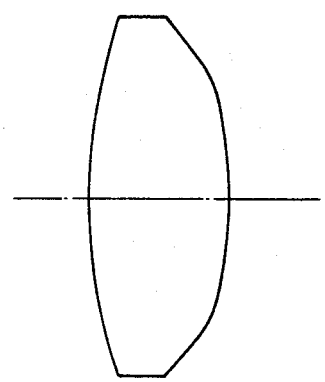
Figure 10:
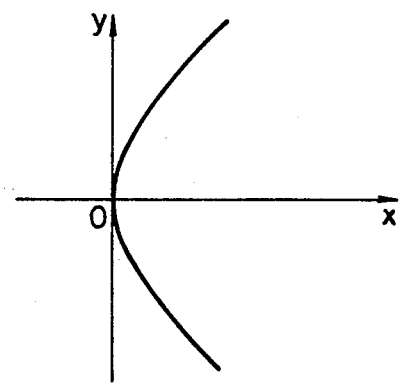
FIG. 10 shows a diagram illustrating a coordinates system for expressing formulae defining aspherical surfaces.
Figure 11:
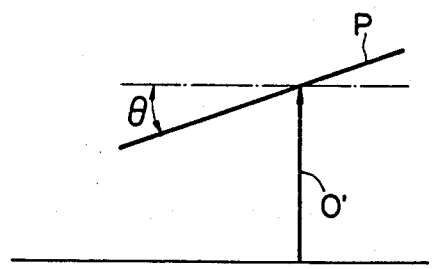
FIG. 11 shows a diagram descriptive of deflection angle of the principal ray.

Now, numerical data will be clarified as preferred embodiments of the objective lens system for endoscopes according to the present invention described above.

| Embodiment 1 | | | |
|---|---|---|---|
| $r_1 = 6.1789$ | | | |
| $d_1 = 0.7129$ | $n_1 = 1.8830$ | | $\nu_1 = 40.76$ |
| $r_2 = 3.8110$ | | | |
| $d_2 = 0.5704$ | | | |
| $r_3 = 16.0271$ | (aspherical surface) | | |
| $d_3 = 0.6654$ | $n_2 = 1.49109$ | | $\nu_2 = 57.00$ |
| $r_4 = 2.2192$ | | | |
| $d_4 = 1.1407$ | | | |
| $r_5 = 9.5060$ | | | |
| $d_5 = 0.9506$ | $n_3 = 1.80518$ | | $\nu_3 = 25.43$ |
| $r_6 = -9.5066$ | | | |

-continued

| | | |
|---|---|---|
| $d_6 = 0.3802$ | $n_4 = 1.77250$ | $\nu_4 = 49.66$ |
| $r_7 = 4.3058$ | | |
| $d_7 = 2.6617$ | | |
| $r_8 = -1.3401$ | | |
| $d_8 = 0.9506$ | $n_5 = 1.80610$ | $\nu_5 = 40.95$ |
| $r_9 = -1.7300$ | | |
| $d_9 = 0.3327$ | | |
| $r_{10} = \infty$ stop | | |
| $d_{10} = 0.0570$ | | |
| $r_{11} = -6.6171$ | | |
| $d_{11} = 1.2358$ | $n_6 = 1.58913$ | $\nu_6 = 60.97$ |
| $r_{12} = -1.2320$ | | |
| $d_{12} = 1.1882$ | $n_7 = 1.66998$ | $\nu_7 = 39.32$ |
| $r_{13} = -4.3271$ | | |
| $d_{13} = 1.5381$ | | |
| $r_{14} = 40.6961$ | | |
| $d_{14} = 1.0932$ | $n_8 = 1.80610$ | $\nu_8 = 40.95$ |
| $r_{15} = -4.9754$ | | |
| $d_{15} = 0.1426$ | | |
| $r_{16} = 4.0439$ | | |
| $d_{16} = 1.8061$ | $n_9 = 1.60311$ | $\nu_9 = 60.70$ |
| $r_{17} = -4.0439$ | | |
| $d_{17} = 0.5704$ | $n_{10} = 1.80518$ | $\nu_{10} = 25.43$ |
| $r_{18} = 6.7198$ | | |
| $d_{18} = 2.3698$ | | |
| $r_{19} = \infty$ | | |
| $d_{19} = 0.6654$ | $n_{11} = 1.56384$ | $\nu_{11} = 60.69$ |
| $r_{20} = \infty$ | | |

$f = 1$, $F_{NO} = 2.544$, image height $= 0.97436$
$P = 1.0000$, $B = 0$, $E = 0.70488 \times 10^{-2}$
$F = 0.17289 \times 10^{-3}$, $G = 0$ Embodiment 2

| | | |
|---|---|---|
| $r_1 = 4.4865$ | | |
| $d_1 = 0.5982$ | $n_1 = 1.88300$ | $\nu_1 = 40.76$ |
| $r_2 = 2.0438$ | | |
| $d_2 = 0.5483$ | | |
| $r_3 = \infty$ (aspherical surface) | | |
| $d_3 = 1.1066$ | $n_2 = 1.49109$ | $\nu_2 = 57.00$ |
| $r_4 = 1.0614$ | | |
| $d_4 = 1.7035$ | | |
| $r_5 = 1.7151$ | | |
| $d_5 = 0.2157$ | $n_3 = 1.78590$ | $\nu_3 = 44.18$ |
| $r_6 = 1.4071$ | | |
| $d_6 = 0.6995$ | | |
| $r_7 = -1.5783$ | | |
| $d_7 = 0.5555$ | $n_4 = 1.80610$ | $\nu_4 = 40.95$ |
| $r_8 = -1.4248$ | | |
| $d_8 = 0.0014$ | | |
| $r_9 = \infty$ stop | | |
| $d_9 = 0.0598$ | | |
| $r_{10} = -6.9401$ | | |
| $d_{10} = 1.2961$ | $n_5 = 1.58913$ | $\nu_5 = 60.97$ |
| $r_{11} = -1.2921$ | | |
| $d_{11} = 1.2462$ | $n_6 = 1.66998$ | $\nu_6 = 39.32$ |
| $r_{12} = -4.5383$ | | |
| $d_{12} = 1.6131$ | | |
| $r_{13} = 42.6826$ | | |
| $d_{13} = 1.1465$ | $n_7 = 1.80610$ | $\nu_7 = 40.95$ |
| $r_{14} = -5.2183$ | | |
| $d_{14} = 0.1495$ | | |
| $r_{15} = 4.2412$ | | |
| $d_{15} = 1.8943$ | $n_8 = 1.60311$ | $\nu_8 = 60.70$ |
| $r_{16} = -4.2412$ | | |
| $d_{16} = 0.5982$ | $n_9 = 1.80518$ | $\nu_9 = 25.43$ |
| $r_{17} = 7.0478$ | | |
| $d_{17} = 2.4845$ | | |
| $r_{18} = \infty$ | | |
| $d_{18} = 0.6979$ | $n_{10} = 1.56384$ | $\nu_{10} = 60.69$ |
| $r_{19} = \infty$ | | |

$f = 1$, $F_{NO} = 2.588$, image height $= 1.0219$
$P = -1.0000$, $B = 0.16225 \times 10^{-1}$
$E = 0.50809 \times 10^{-1}$, $F = 0.34471 \times 10^{-7}$, $G = 0$ Embodiment 3

| | | |
|---|---|---|
| $r_1 = \infty$ (aspherical surface) | | |

-continued

| | | |
|---|---|---|
| $d_1 = 0.6186$ | $n_1 = 1.49109$ | $\nu_1 = 57.00$ |
| $r_2 = 1.6347$ | | |
| $d_2 = 0.8247$ | | |
| $r_3 = 5.4807$ | | |
| $d_3 = 0.5155$ | $n_2 = 1.88300$ | $\nu_2 = 40.76$ |
| $r_4 = 2.63388$ | | |
| $d_4 = 1.9166$ | | |
| $r_5 = \infty$ | | |
| $d_5 = 0.5155$ | $n_3 = 1.78590$ | $\nu_3 = 44.18$ |
| $r_6 = \infty$ | | |
| $d_6 = 0.5826$ | | |
| $r_7 = -1.5709$ | | |
| $d_7 = 1.1340$ | $n_4 = 1.80610$ | $\nu_4 = 40.95$ |
| $r_8 = -1.9679$ | | |
| $d_8 = 0.0014$ | | |
| $r_9 = \infty$ stop | | |
| $d_9 = 0.6017$ | | |
| $r_{10} = -7.1548$ | | |
| $d_{10} = 1.3362$ | $n_5 = 1.58913$ | $\nu_5 = 60.97$ |
| $r_{11} = -1.3321$ | | |
| $d_{11} = 1.2848$ | $n_6 = 1.66998$ | $\nu_6 = 39.32$ |
| $r_{12} = -4.6787$ | | |
| $d_{12} = 1.6630$ | | |
| $r_{13} = 44.0027$ | | |
| $d_{13} = 1.1820$ | $n_7 = 1.80610$ | $\nu_7 = 40.95$ |
| $r_{14} = -5.3797$ | | |
| $d_{14} = 0.1542$ | | |
| $r_{15} = 4.3724$ | | |
| $d_{15} = 1.9529$ | $n_8 = 1.60311$ | $\nu_8 = 60.70$ |
| $r_{16} = -4.3724$ | | |
| $d_{16} = 0.6167$ | $n_9 = 1.80518$ | $\nu_9 = 25.43$ |
| $r_{17} = 7.2658$ | | |
| $d_{17} = 2.5614$ | | |
| $r_{18} = \infty$ | | |
| $d_{18} = 0.7195$ | $n_{10} = 1.56384$ | $\nu_{10} = 60.69$ |
| $r_{19} = \infty$ | | |

$f = 1$, $F_{NO} = 2.531$, image height $= 1.0535$
$P = -1.0000$, $B = 0$, $E = 0.13075 \times 10^{-1}$
$F = 0$, $G = 0$ Embodiment 4

| | | |
|---|---|---|
| $r_1 = 7.0140$ | | |
| $d_1 = 0.7515$ | $n_1 = 1.88300$ | $\nu_1 = 40.76$ |
| $r_2 = 3.9221$ | | |
| $d_2 = 0.8617$ | | |
| $r_3 = 5.5110$ | | |
| $d_3 = 0.7014$ | $n_2 = 1.49109$ | $\nu_2 = 57.00$ |
| $r_4 = 1.5917$ (aspherical surface) | | |
| $d_4 = 1.0521$ | | |
| $r_5 = 4.0080$ | | |
| $d_5 = 1.1022$ | $n_3 = 1.80518$ | $\nu_3 = 25.43$ |
| $r_6 = -10018.9980$ | | |
| $d_6 = 0.4008$ | $n_4 = 1.77250$ | $\nu_4 = 49.66$ |
| $r_7 = 3.0749$ | | |
| $d_7 = 3.3019$ | | |
| $r_8 = -1.4028$ | | |
| $d_8 = 1.0020$ | $n_5 = 1.80610$ | $\nu_5 = 40.95$ |
| $r_9 = -1.8511$ | | |
| $d_9 = 0.3507$ | | |
| $r_{10} = \infty$ stop | | |
| $d_{10} = 0.0601$ | | |
| $r_{11} = -6.9749$ | | |
| $d_{11} = 1.3026$ | $n_6 = 1.58913$ | $\nu_6 = 60.97$ |
| $r_{12} = -1.2986$ | | |
| $d_{12} = 1.2525$ | $n_7 = 1.66998$ | $\nu_7 = 39.32$ |
| $r_{13} = -4.5611$ | | |
| $d_{13} = 1.6212$ | | |
| $r_{14} = 42.8966$ | | |
| $d_{14} = 1.1523$ | $n_8 = 1.80610$ | $\nu_8 = 40.95$ |
| $r_{15} = -5.2445$ | | |
| $d_{15} = 0.1503$ | | |
| $r_{16} = 4.2625$ | | |
| $d_{16} = 1.0938$ | $n_9 = 1.60311$ | $\nu_9 = 60.70$ |
| $r_{17} = -4.2625$ | | |
| $d_{17} = 0.6012$ | $n_{10} = 1.80518$ | $\nu_{10} = 25.43$ |
| $r_{18} = 7.0831$ | | |
| $d_{18} = 2.4970$ | | |
| $r_{19} = \infty$ | | |
| $d_{19} = 0.7014$ | $n_{11} = 1.56384$ | $\nu_{11} = 60.69$ |

-continued $r_{20} = \infty$
$f = 1, F_{NO} = 2.561$, image height = 1.02705
$P = 0, B = 0, E = -0.13727 \times 10^{-2}$
$F = 0.25809 \times 10^{-3}, G = 0$ Embodiment 5

| | | |
|---|---|---|
| $r_1 = 7.5512$ | | |
| $d_1 = 0.8091$ | $n_1 = 1.88300$ | $\nu_1 = 40.76$ |
| $r_2 = 4.2225$ | | |
| $d_2 = 0.9277$ | | |
| $r_3 = 5.9331$ | | |
| $d_3 = 0.7551$ | $n_2 = 1.49109$ | $\nu_2 = 57.00$ |
| $r_4 = 1.7136$ (aspherical surface) | | |
| $d_4 = 1.1327$ | | |
| $r_5 = 4.3150$ | | |
| $d_5 = 1.1866$ | $n_3 = 1.80518$ | $\nu_3 = 25.43$ |
| $r_6 = -10786.4078$ | | |
| $d_6 = 0.4315$ | $n_4 = 1.77250$ | $\nu_4 = 49.66$ |
| $r_7 = 3.3104$ | | |
| $d_7 = 3.5548$ | | |
| $r_8 = -1.5102$ | | |
| $d_8 = 1.0787$ | $n_5 = 1.80610$ | $\nu_5 = 40.95$ |
| $r_9 = -1.9929$ | | |
| $d_9 = 0.3776$ | | |
| $r_{10} = \infty$ (stop) | | |
| $d_{10} = 0.7704$ | $n_6 = 1.51633$ | $\nu_6 = 64.15$ |
| $r_{11} = \infty$ | | |
| $d_{11} = 1.5410$ | | |
| $r_{12} = -23.2120$ | | |
| $d_{12} = 0.6164$ | $n_7 = 1.78472$ | $\nu_7 = 25.71$ |
| $r_{13} = 7.7327$ | | |
| $d_{13} = 1.5410$ | $n_8 = 1.69680$ | $\nu_8 = 55.52$ |
| $r_{14} = -4.6245$ | | |
| $d_{14} = 0.3082$ | | |
| $r_{15} = 5.0791$ | | |
| $d_{15} = 2.0032$ | $n_9 = 1.58913$ | $\nu_9 = 60.97$ |
| $r_{16} = -3.6013$ | | |
| $d_{16} = 0.6164$ | $n_{10} = 1.78472$ | $\nu_{10} = 25.71$ |
| $r_{17} = -7.7928$ | | |

$f = 1, F_{NO} = 2.374$, image height = 1.1057
$P = 0, B = 0, E = -0.11001 \times 10^{-2}$
$F = 0.17844 \times 10^{-3}, G = 0$ Embodiment 6

| | | |
|---|---|---|
| $r_1 = 3.8648$ | | |
| $d_1 = 0.4533$ | $n_1 = 1.88300$ | $\nu_1 = 40.76$ |
| $r_2 = 1.7120$ | | |
| $d_2 = 0.5359$ | | |
| $r_3 = -261.1516$ | | |
| $d_3 = 0.4946$ | $n_2 = 1.49109$ | $\nu_2 = 57.00$ |
| $r_4 = 1.2965$ (aspherical surface) | | |
| $d_4 = 2.2278$ | | |
| $r_5 = 15.9398$ | | |
| $d_5 = 0.8254$ | $n_3 = 1.80518$ | $\nu_3 = 25.43$ |
| $r_6 = -2.5723$ | | |
| $d_6 = 0.3875$ | $n_4 = 1.56873$ | $\nu_4 = 63.16$ |
| $r_7 = -138.3595$ | | |
| $d_7 = 0.2887$ | | |
| $r_8 = \infty$ (stop) | | |
| $d_8 = 0.0495$ | | |
| $r_9 = -5.7387$ | | |
| $d_9 = 1.0717$ | $n_5 = 1.58913$ | $\nu_5 = 60.97$ |
| $r_{10} = -1.0684$ | | |
| $d_{10} = 1.0305$ | $n_6 = 1.66998$ | $\nu_6 = 39.32$ |
| $r_{11} = -3.7527$ | | |
| $d_{11} = 1.3339$ | | |
| $r_{12} = 35.2935$ | | |
| $d_{12} = 0.9481$ | $n_7 = 1.80610$ | $\nu_7 = 40.95$ |
| $r_{13} = -4.3149$ | | |
| $d_{13} = 0.1237$ | | |
| $r_{14} = 3.5070$ | | |
| $d_{14} = 1.5664$ | $n_8 = 1.60311$ | $\nu_8 = 60.70$ |
| $r_{15} = -3.5070$ | | |
| $d_{15} = 0.4946$ | $n_9 = 1.80518$ | $\nu_9 = 25.43$ |
| $r_{16} = 5.8277$ | | |
| $d_{16} = 2.0544$ | | |

-continued $r_{17} = \infty$
$d_{17} = 0.5771$  $n_{10} = 1.56384$  $\nu_{10} = 60.69$
$r_{18} = \infty$
$f = 1, F_{NO} = 3.714$, image height = 0.8450
$P = -4.0000, B = 0, E = 0, F = 0, G = 0$ Embodiment 7

| | | |
|---|---|---|
| $r_1 = 6.1379$ | | |
| $d_1 = 0.7082$ | $n_1 = 1.88300$ | $\nu_1 = 40.76$ |
| $r_2 = 2.8682$ | | |
| $d_2 = 0.9443$ | | |
| $r_3 = 7.7708$ (aspherical surface) | | |
| $d_3 = 0.6610$ | $n_2 = 1.49109$ | $\nu_2 = 57.00$ |
| $r_4 = 2.4614$ (aspherical surface) | | |
| $d_4 = 1.1331$ | | |
| $r_5 = 9.4429$ | | |
| $d_5 = 0.9443$ | $n_3 = 1.80518$ | $\nu_3 = 25.43$ |
| $r_6 = -9.4429$ | | |
| $d_6 = 0.3777$ | $n_4 = 1.77250$ | $\nu_4 = 49.66$ |
| $r_7 = 7.1863$ | | |
| $d_7 = 2.6440$ | | |
| $r_8 = -1.2695$ | | |
| $d_8 = 0.9443$ | $n_5 = 1.80610$ | $\nu_5 = 40.95$ |
| $r_9 = -1.6981$ | | |
| $d_9 = 0.3305$ | | |
| $r_{10} = \infty$ stop | | |
| $d_{10} = 0.0567$ | | |
| $r_{11} = -6.5732$ | | |
| $d_{11} = 1.2276$ | $n_6 = 1.58913$ | $\nu_6 = 60.97$ |
| $r_{12} = -1.2238$ | | |
| $d_{12} = 1.1804$ | $n_7 = 1.66998$ | $\nu_7 = 39.32$ |
| $r_{13} = -4.2984$ | | |
| $d_{13} = 1.5279$ | | |
| $r_{14} = 40.4259$ | | |
| $d_{14} = 1.0859$ | $n_8 = 1.80610$ | $\nu_8 = 40.95$ |
| $r_{15} = -4.9424$ | | |
| $d_{15} = 0.1416$ | | |
| $r_{16} = 4.0170$ | | |
| $d_{16} = 1.7941$ | $n_9 = 1.60311$ | $\nu_9 = 60.70$ |
| $r_{17} = -4.0170$ | | |
| $d_{17} = 0.5666$ | $n_{10} = 1.80518$ | $\nu_{10} = 25.43$ |
| $r_{18} = 6.6752$ | | |
| $d_{18} = 2.3532$ | | |
| $r_{19} = \infty$ | | |
| $d_{19} = 0.6610$ | $n_{11} = 1.56384$ | $\nu_{11} = 60.69$ |
| $r_{20} = \infty$ | | |

$f = 1, F_{NO} = 2.543$, image height = 0.9679
third surface $P = 1.0000, B = 0, E = 0.22454 \times 10^{-2}$
$F = 0.15533 \times 10^{-3}, G = 0$
fourth surface $P = 1.0000, B = 0, E = 0.95012 \times 10^{-2}$
$F = -0.26639 \times 10^{-2}, G = 0$ Embodiment 8

| | | |
|---|---|---|
| $r_1 = 10.3716$ | | |
| $d_1 = 0.7992$ | $n_1 = 1.88300$ | $\nu_1 = 40.76$ |
| $r_2 = 17.9820$ | | |
| $d_2 = 0.0999$ | | |
| $r_3 = 12.0112$ (aspherical surface) | | |
| $d_3 = 0.6993$ | $n_2 = 1.49109$ | $\nu_2 = 57.00$ |
| $r_4 = 4.9950$ | | |
| $d_4 = 0.3996$ | $n_3 = 1.80610$ | $\nu_3 = 40.95$ |
| $r_5 = 2.4975$ | | |
| $d_5 = 0.7992$ | | |
| $r_6 = -19.2639$ | | |
| $d_6 = 0.3996$ | $n_4 = 1.88300$ | $\nu_4 = 40.76$ |
| $r_7 = 1.9643$ | | |
| $d_7 = 2.3429$ | | |
| $r_8 = 15.5038$ | | |
| $d_8 = 0.5455$ | $n_5 = 1.78590$ | $\nu_5 = 44.18$ |
| $r_9 = -84.2272$ | | |
| $d_9 = 0.5669$ | | |
| $r_{10} = -1.9200$ | | |
| $d_{10} = 1.0992$ | $n_6 = 1.80610$ | $\nu_6 = 40.95$ |
| $r_{11} = -2.3493$ | | |
| $d_{11} = 0.3497$ | | |
| $r_{12} = \infty$ stop | | |

-continued $d_{12} = 0.0599$
$r_{13} = -6.9540$
$d_{13} = 1.2987$   $n_7 = 1.58913$   $\nu_7 = 60.97$
$r_{14} = -1.2947$
$d_{14} = 1.2488$   $n_8 = 1.66998$   $\nu_8 = 39.32$
$r_{15} = -4.5475$
$d_{15} = 1.6164$
$r_{16} = 42.7682$
$d_{16} = 1.1489$   $n_9 = 1.80610$   $\nu_9 = 40.95$
$r_{17} = -5.2288$
$d_{17} = 0.1499$
$r_{18} = 4.2498$
$d_{18} = 1.8981$   $n_{10} = 1.60311$   $\nu_{10} = 60.70$
$r_{19} = -4.2498$
$d_{19} = 0.5994$   $n_{11} = 1.80518$   $\nu_{11} = 25.43$
$r_{20} = 7.0619$
$d_{20} = 2.4895$
$r_{21} = \infty$
$d_{21} = 0.6993$   $n_{12} = 1.56384$   $\nu_{12} = 60.69$
$r_{22} = \infty$
$f = 1$, $F_{NO} = 2.581$, image height $= 1.0240$
$P = 1.000$, $B = 0$, $E = 0.92329 \times 10^{-2}$
$F = -0.22743 \times 10^{-3}$, $G = 0$ Embodiment 9
$r_1 = 8.8295$
$d_1 = 0.8048$   $n_1 = 1.88300$   $\nu_1 = 40.76$
$r_2 = 18.1087$
$d_2 = 0.1006$
$r_3 = 6.3299$   (aspherical surface)
$d_3 = 0.6036$   $n_2 = 1.80610$   $\nu_2 = 40.95$
$r_4 = 2.4397$
$d_4 = 0.9054$
$r_5 = 9.6935$
$d_5 = 0.4024$   $n_3 = 1.88300$   $\nu_3 = 40.76$
$r_6 = 1.8280$
$d_6 = 2.4161$
$r_7 = 50.2371$
$d_7 = 0.5505$   $n_4 = 1.78590$   $\nu_4 = 44.18$
$r_8 = 24.9036$
$d_8 = 0.5712$
$r_9 = -1.9359$
$d_9 = 1.1101$   $n_5 = 1.80610$   $\nu_5 = 40.95$
$r_{10} = -2.2035$
$d_{10} = 0.3521$
$r_{11} = \infty$ stop
$d_{11} = 0.0604$
$r_{12} = -7.0030$
$d_{12} = 1.3078$   $n_6 = 1.58913$   $\nu_6 = 60.97$
$r_{13} = -1.3038$
$d_{13} = 1.2575$   $n_7 = 1.66998$   $\nu_7 = 39.32$
$r_{14} = -4.5795$
$d_{14} = 1.6278$
$r_{15} = 43.0694$
$d_{15} = 1.1569$   $n_8 = 1.80610$   $\nu_8 = 40.95$
$r_{16} = -5.2656$
$d_{16} = 0.1509$
$r_{17} = 4.2797$
$d_{17} = 1.9115$   $n_9 = 1.60311$   $\nu_9 = 60.70$
$r_{18} = -4.2797$ -continued $d_{18} = 0.6036$   $n_{10} = 1.80518$   $\nu_{10} = 25.43$
$r_{19} = 7.1117$
$d_{19} = 2.5070$
$r_{20} = \infty$
$d_{20} = 0.7042$   $n_{11} = 1.56384$   $\nu_{11} = 60.69$
$r_{21} = \infty$
$f = 1$, $F_{NO} = 2.617$, image height $= 1.0312$
$P = 1.0000$, $B = 0$, $E = 0.86037 \times 10^{-2}$
$F = -0.38814 \times 10^{-3}$, $G = -0.27509 \times 10^{-11}$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

Figure 12:
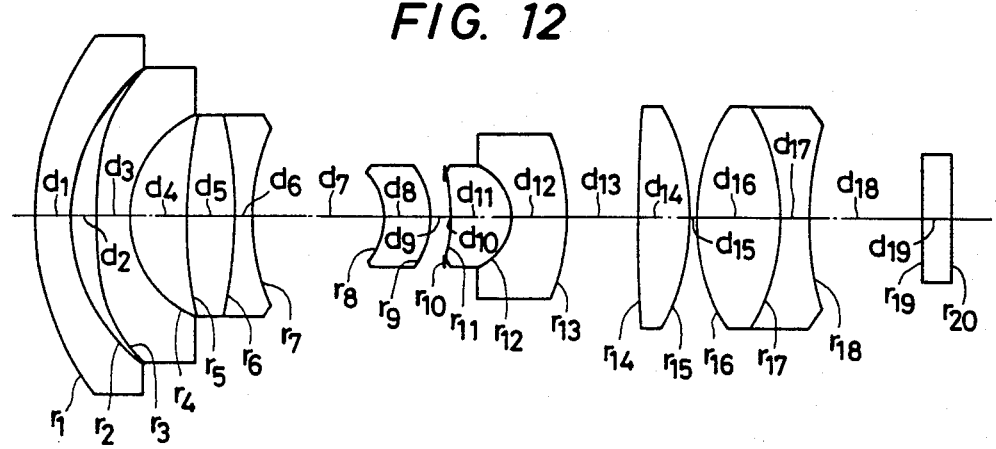
FIG. 12 through FIG. 20 show sectional views illustrating Embodiments 1 through 9 of the objective lens system according to the present invention.
Figure 13:
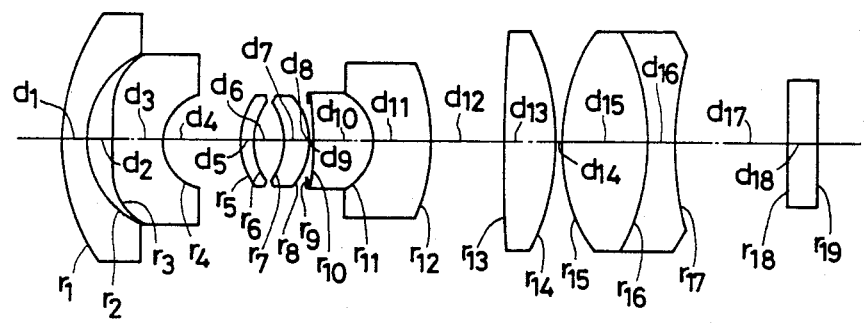
Figure 14:
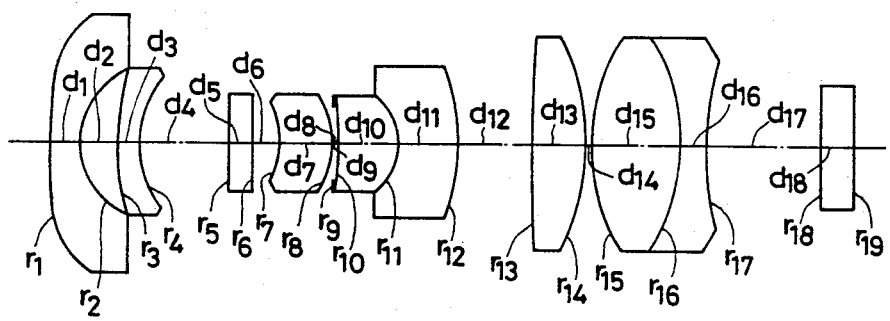
Figure 15:
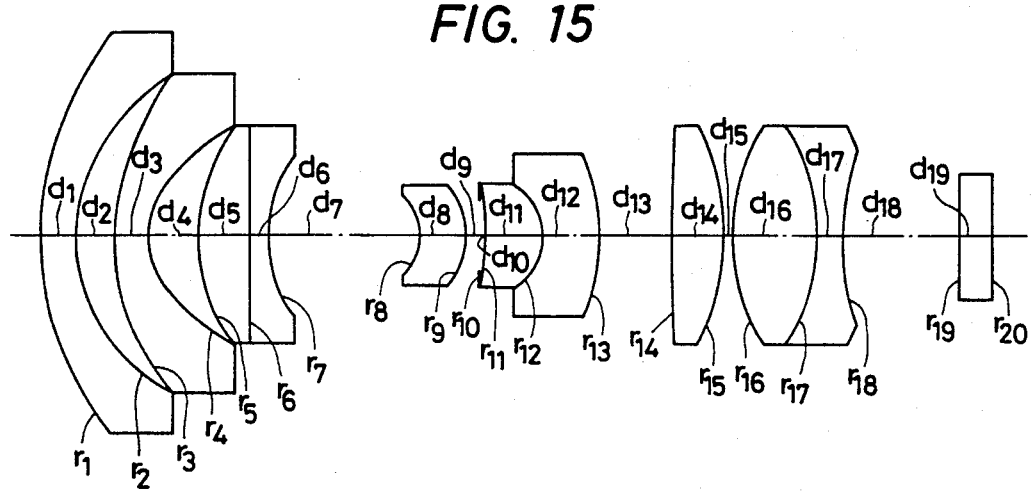
Figure 16:
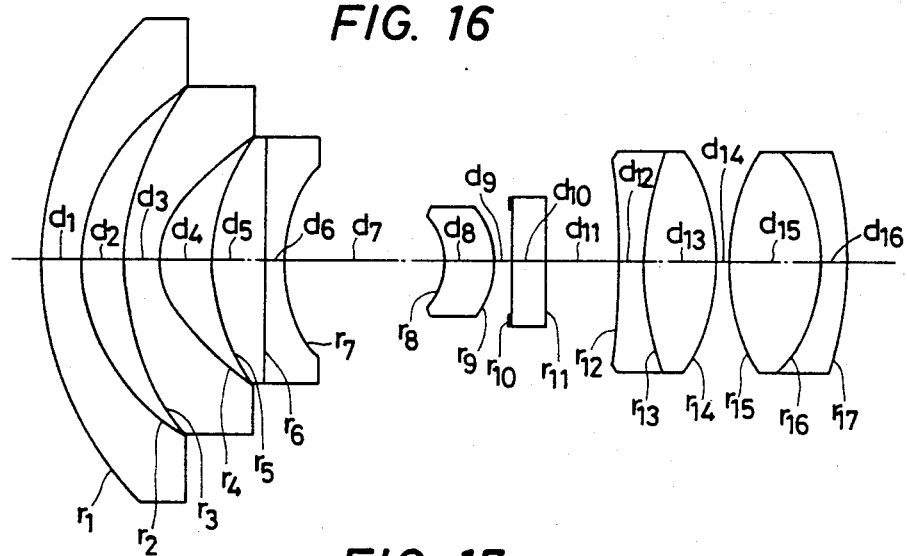
Figure 17:
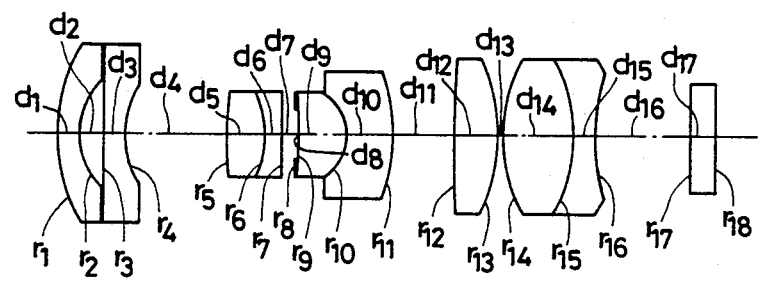
Figure 18:
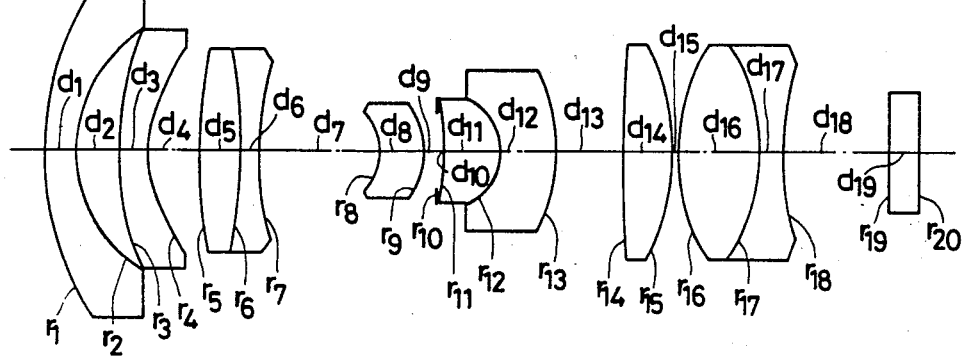
Figure 19:
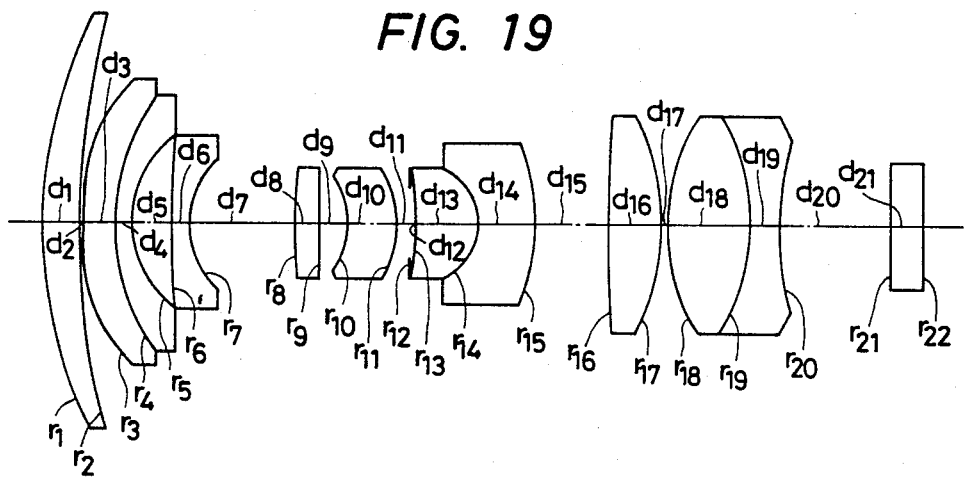
Figure 20:
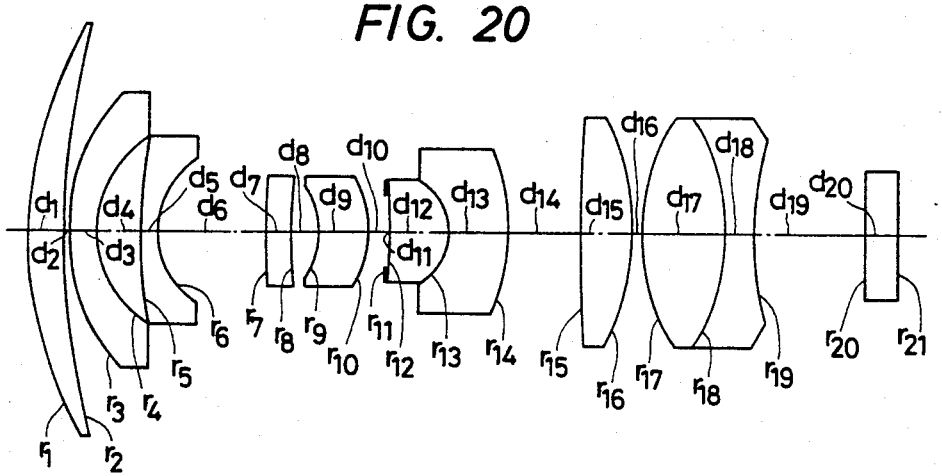

The Embodiments 1 through 9 mentioned above are objective lens systems having the compositions shown in FIG. 12 through FIG. 20 respectively.

In Embodiments 1, 2, 8 and 9 out of the embodiments mentioned above, the object side surface of the second lens component as counted from the object side is designed as an aspherical surface having portions whose curvature is increased as they are farther from the optical axis.

In the Embodiment 3, the extreme object side surface is designed as an aspherical surface having a shape similar to that of the aspherical surface used in the Embodiment 1, etc. described above.

In the Embodiments 4 through 6, the image side surface of the second lens components as counted from the object side is designed as an aspherical surface having portions whose curvature is decreased as they are farther from the optical axis.

In the Embodiment 7, the object side surface of the second lens component as counted from the object side is designed as an aspherical surface including portions whose curvature is increased as they are farther from the optical axis, and the image side surface of said second lens component is designed as an aspherical surface including portions whose curvature is decreased as they are farther from the optical axis.

The shapes of the aspherical surfaces adopted by respective embodiments described above are defined by the formula (1) and values of their aspherical surface coefficients, etc. are as listed in the numerical data. Values of $y_c$, k etc. adopted for the individual embodiments are as listed in Table 2. As is clear from Table 2, all the values of A are selected within the range defined by the formula (11).

TABLE 2

| Embodiment | | Yc | K | ω(°) | D(%) | D$_s$(%) | H | σ | A |
|---|---|---|---|---|---|---|---|---|---|
| 1 | | −2.616 | −0.3103 | 45° | −5.62 | −29.3 | 1.19 | −1 | 2.857 × 10$^{-6}$ |
| 2 | | −1.475 | −0.332 | 45° | 0.01 | −29.3 | 1.000 | −1 | 3.644 × 10$^{-6}$ |
| 3 | | −2.422 | −0.3649 | 45° | 2.0 | −29.3 | 1.07 | −1 | 3.749 × 10$^{-6}$ |
| 4 | | −1.127 | 0.1472 | 26°99 | 1.86 | −10.9 | 1.17 | 1 | 6.396 × 10$^{-6}$ |
| 5 | | −1.228 | 0.1538 | 28°23 | 1.83 | −11.9 | 1.15 | 1 | 5.921 × 10$^{-6}$ |
| 6 | | −0.773 | 0.1767 | 40° | −0.003 | −23.4 | 0.999 | 1 | 2.76 × 10$^{-6}$ |
| 7 | third surface | −2.233 | 0.3032 | | | | | −1 | |
|   | fourth surface | −1.848 | 0.2870 | | | | | 1 | |
|   | | | 0.5902 | 45° | −5.73 | −29.3 | 0.805 | | 8.05 × 10$^{-6}$ |
| 8 | | −2.87 | −0.2983 | 45°15 | −3.42 | −29.5 | 0.884 | 1 | 3.67 × 10$^{-6}$ |

TABLE 2-continued

| Embodiment | Yc | K | ω(°) | D(%) | $D_s$(%) | H | σ | A |
|---|---|---|---|---|---|---|---|---|
| 9 | −2.68 | −0.2748 | 45° | −3.38 | −29.3 | 0.885 | 1 | $3.41 \times 10^{-6}$ |

Figure 21:
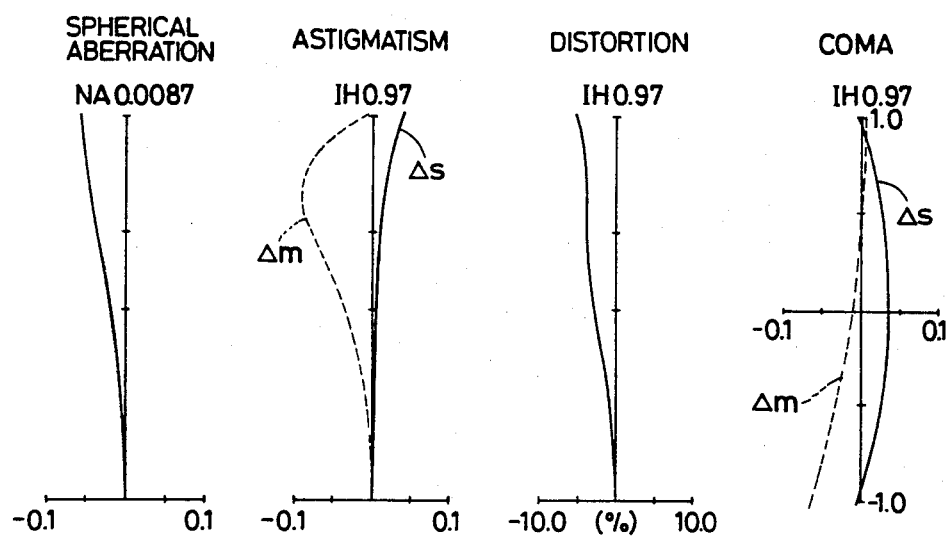
Figure 22:
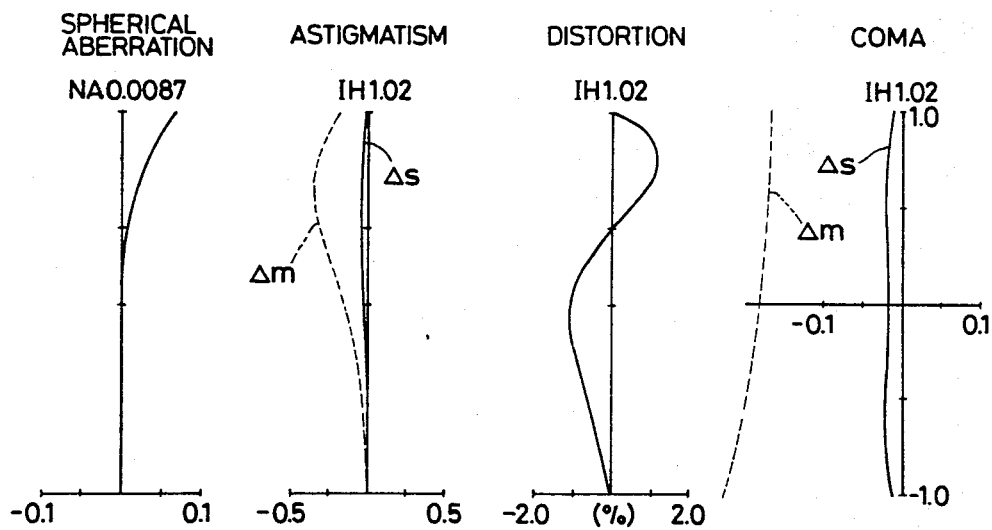
Figure 23:
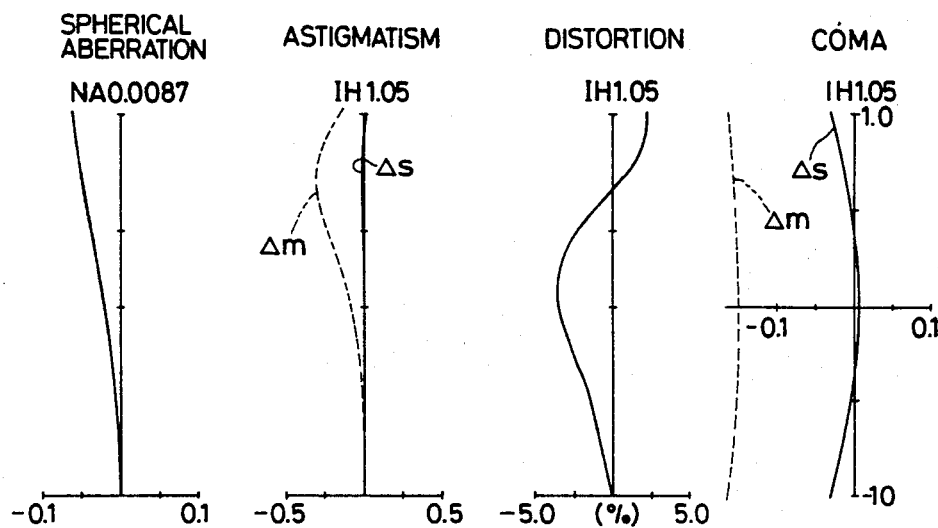
Figure 24:
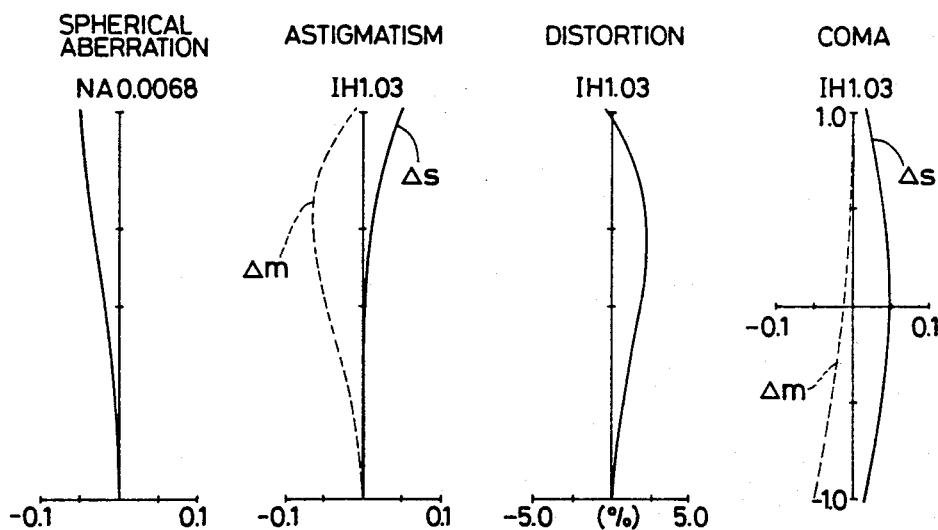
Figure 25:
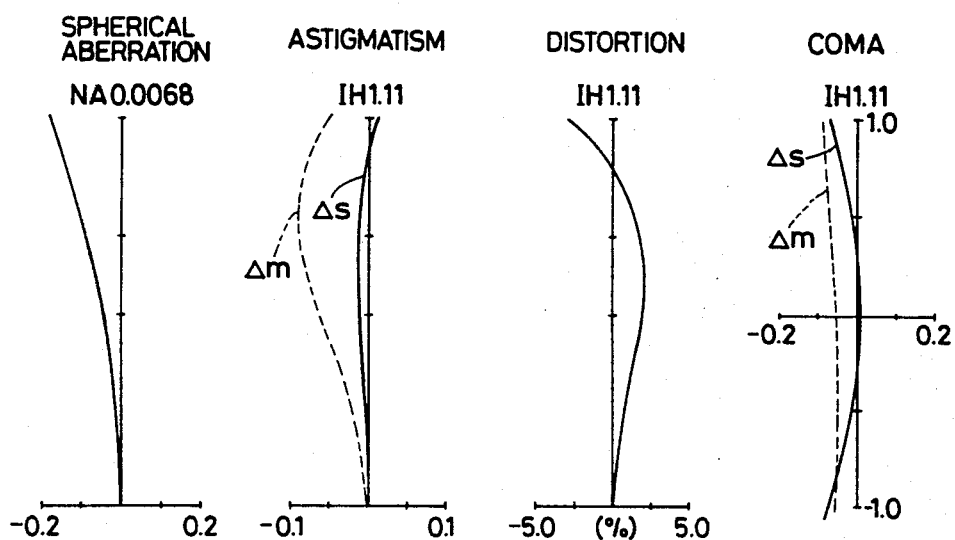
Figure 26:
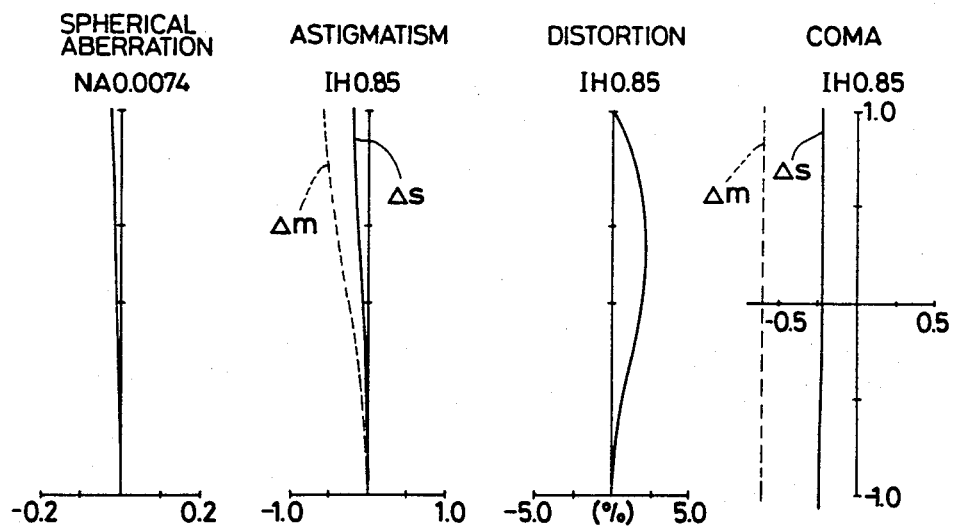
Figure 27:
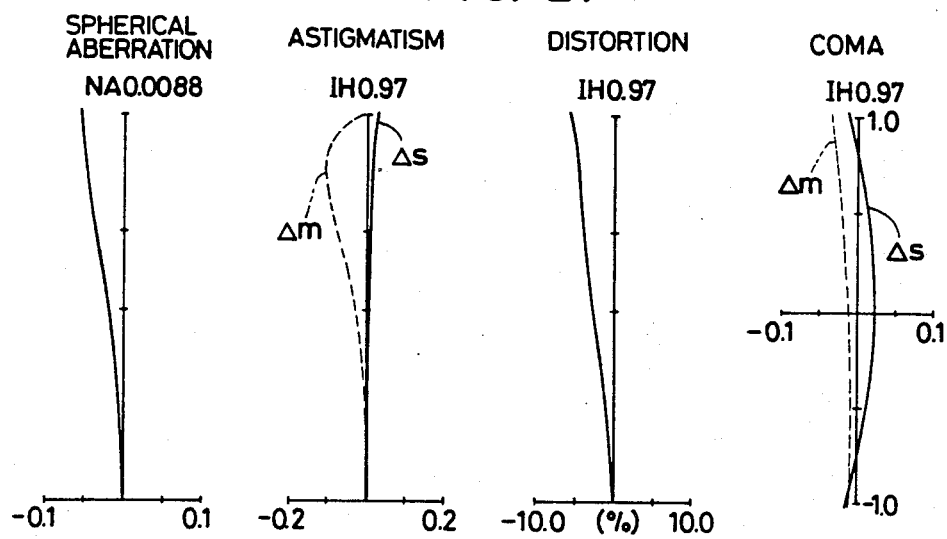
Figure 28:
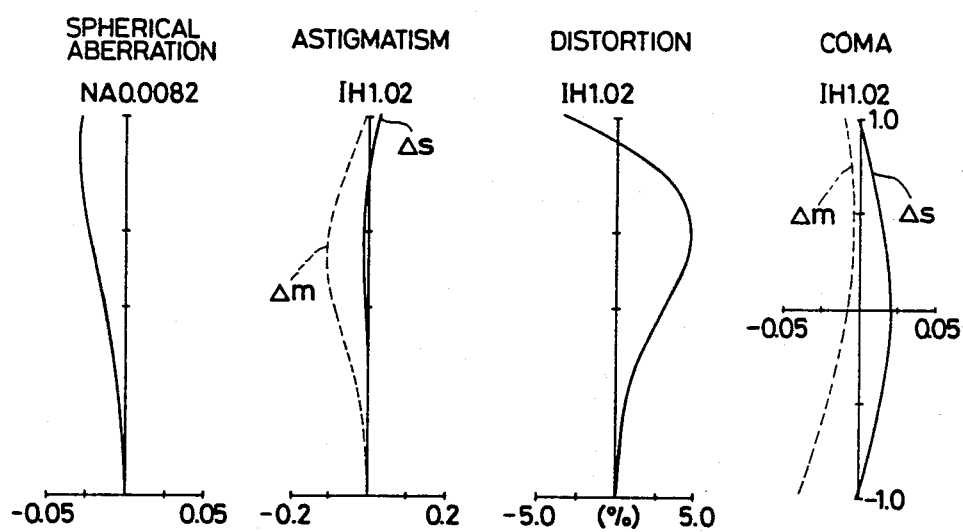

As is understood from the foregoing descriptions, the present invention has succeeded in designing a wide-angle objective lens system for endoscopes having favorably corrected distortion by arranging an aspherical lens surface having the above-described shape in the front lens group. This fact is clear from the aberration characteristic curves of the individual embodiments shown in FIG. 21 through FIG. 29.

I claim:

1. A retrofocus-type objective for endoscopes comprising a front lens group having negative refractive power, a rear lens group having positive refractive power in the order from object side, and a stop arranged between said front and rear lens groups, said front lens group comprising a negative lens element having a concave surface having a selected curvature which is strong and a positive lens element, and said rear lens group having at least two positive lens components, one of said positive lens components being a cemented doublet having a positive lens element and negative lens element the cemented surface of which is convexed to the image side, and at least one of the lens components in said front lens group having an aspherical surface on the object side thereof including portions whose curvature is gradually increased as the distance thereof increases from the optical axis.

2. An objective lens system for endoscopes according to claim 1 wherein said aspherical surface is expressed by the following formula when the optical axis is taken as the x axis, and the straight line passing through the top of said aspherical surface and is perpendicular to the x axis is taken as the y axis:

$$x = \frac{Cy^2}{1 + \sqrt{1 - PC^2y^2}} + By^2 + Ey^4 + Fy^6 + Gy^8 + \ldots$$

wherein the reference symbol C represents an inverse number of the radius of a circle in contact with said aspherical surface in the vicinity of the optical axis, the reference symbol P designates a parameter representing shape of said aspherical surface, and the reference symbols B, E, F, G, ... denote the second power, fourth power, sixth power, eighth power aspherical surface coefficients respectively.

3. An object lens system for endoscopes according to claim 2 wherein said system includes a factor A and wherein factor A satisfies the following formula when degree of deflection angle K for the principal ray is expressed as $$K = A \cdot \omega^3 \cdot H \cdot \sigma$$

$$A < \frac{3.5 \times 10^{-4}}{F_{NO}}$$

wherein the reference symbol 2ω represents angle of view, the reference symbol H designates correction ratio and σ denotes a value of −1 when said aspherical surface is arranged on the object side of said lens component.

4. An objective lens system for endoscopes according to claim 3 wherein said front lens group comprises a negative meniscus lens component, a negative meniscus lens component, a cemented doublet and a meniscus lens component, said rear lens group comprises a cemented doublet, a positive lens component, a cemented doublet and a cover glass, and the object side surface of the second negative meniscus lens component as counted from the object side in said front lens group is designed as the aspherical surface, said objective lens system having the following numerical data:

| | | |
|---|---|---|
| $r_1 = 6.1789$ | | |
| $d_1 = 0.7129$ | $n_1 = 1.8830$ | $\nu_1 = 40.76$ |
| $r_2 = 3.8110$ | | |
| $d_2 = 0.5704$ | | |
| $r_3 = 16.0271$ | (aspherical surface) | |
| $d_3 = 0.6654$ | $n_2 = 1.49109$ | $\nu_2 = 57.00$ |
| $r_4 = 2.2192$ | | |
| $d_4 = 1.1407$ | | |
| $r_5 = 9.5060$ | | |
| $d_5 = 0.9506$ | $n_3 = 1.80518$ | $\nu_3 = 25.43$ |
| $r_6 = -9.5060$ | | |
| $d_6 = 0.3802$ | $n_4 = 1.77250$ | $\nu_4 = 49.66$ |
| $r_7 = 4.3058$ | | |
| $d_7 = 2.6617$ | | |
| $r_8 = -1.3401$ | | |
| $d_8 = 0.9506$ | $n_5 = 1.80610$ | $\nu_5 = 40.95$ |
| $r_9 = -1.7300$ | | |
| $d_9 = 0.3327$ | | |
| $r_{10} = \infty$ (stop) | | |
| $d_{10} = 0.0570$ | | |
| $r_{11} = -6.6171$ | | |
| $d_{11} = 1.2358$ | $n_6 = 1.58913$ | $\nu_6 = 60.97$ |
| $r_{12} = -1.2320$ | | |
| $d_{12} = 1.1882$ | $n_7 = 1.66998$ | $\nu_7 = 39.32$ |
| $r_{13} = -4.3271$ | | |
| $d_{13} = 1.5381$ | | |
| $r_{14} = 40.6961$ | | |
| $d_{14} = 1.0932$ | $n_8 = 1.80610$ | $\nu_8 = 40.95$ |
| $r_{15} = -4.9754$ | | |
| $d_{15} = 0.1426$ | | |
| $r_{16} = 4.0439$ | | |
| $d_{16} = 1.8061$ | $n_9 = 1.60311$ | $\nu_9 = 60.70$ |
| $r_{17} = -4.0439$ | | |
| $d_{17} = 0.5704$ | $n_{10} = 1.80518$ | $\nu_{10} = 25.43$ |
| $r_{18} = 6.7198$ | | |
| $d_{18} = 2.3689$ | | |
| $r_{19} = \infty$ | | |
| $d_{19} = 0.6654$ | $n_{11} = 1.56384$ | $\nu_{11} = 60.69$ |
| $r_{20} = \infty$ | | |
| $f = 1$, $F_{NO} = 2.544$, image height $= 0.97436$ | | |
| $P = 1.0000$, $B = 0$, $E = 0.70488 \times 10^{-2}$ | | |
| $F = 0.17289 \, 10^{-3}$, $G = 0$ | | | wherein the reference symbols $r_1$ through $r_{20}$ represent radii of curvature on the surfaces of the respective lens elements, the reference symbols $d_1$ through $d_{19}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

5. An object lens system for endoscopes according to claim 3 wherein said front lens group comprises a negative meniscus lens component, a negative meniscus lens component, a nemiscus lens component and a meniscus lens component, said rear lens group comprises a cemented doublet, a positive lens component, a cemented doublet and a cover glass, and the object side surface of the second negative meniscus lens component as counted on from the object side in said front lens group is designed as an aspherical surface, said objective lens system having the following numerical data:

```
r1 = 4.4865
d1 = 0.5982      n1 = 1.88300    ν1 = 40.76
r2 = 2.0438
d2 = 0.5483
r3 = ∞   (aspherical surface)
d3 = 1.1066      n2 = 1.49109    ν2 = 57.00
r4 = 1.0614
d4 = 1.7035
r5 = 1.7161
d5 = 0.2157      n3 = 1.78590    ν3 = 44.18
r6 = 1.4071
d6 = 0.6995
r7 = −1.5783
d7 = 0.5555      n4 = 1.80610    ν4 = 40.95
r8 = −1.4248
d8 = 0.0014
r9 = ∞   (stop)
d9 = 0.0598
r10 = −6.9401
d10 = 1.2961     n5 = 1.58913    ν5 = 60.97
r11 = −1.2921
d11 = 1.2462     n6 = 1.66998    ν6 = 39.32
r12 = −4.5483
d12 = 1.6131
r13 = 43.6826
d13 = 1.1465     n7 = 1.80610    ν7 = 40.95
r14 = −5.2183
d14 = 0.1495
r15 = 4.2412
d15 = 1.8943     n8 = 1.60311    ν8 = 60.70
r16 = −4.2412
d16 = 0.5982     n9 = 1.80518    ν9 = 25.43
r17 = 7.0478
d17 = 2.4845
r18 = ∞
d18 = 0.6979     n10 = 1.56384   ν10 = 60.69
r19 = ∞
f = 1, F_NO = 2.588, image height = 1.0219
P = −1.0000, B = 0.16225 × 10^−1, E = 0.50809 × 10^−1
F = 0.34471 × 10^−7, G = 0
``` wherein the reference symbols $r_1$ through $r_{19}$ represent radii of curvature on the surraces of the respective lens elements, the reference symbols $d_1$ through $d_{18}$ designate thicknesses of the respective lens elements and airspaces reserved therebetween, the reference symbols $n_1$ through $n_{10}$ denote refractive indices of the respective lens elements, and the reference symbol $\nu_1$ through $\nu_{10}$ represent Abbe's numbers of the respective lens elements.

6. An objective lens system for endoscopes according to claim 3 wherein said front lens group comprises a negative meniscus lens component, a negative meniscus lens component, a plane parallel plate and a meniscus lens component, said rear lens group comprises a cemented doublet, a positive lens component, a cemented doublet and a cover glass, and the extreme object side surface is designed as an aspherical surface, said objective lens system having the following numerical data:

```
r1 = ∞   (aspherical surface)
d1 = 0.6186      n1 = 1.49109    ν1 = 57.00
r2 = 1.6347
d2 = 0.8247
r3 = 5.4807
d3 = 0.5155      n2 = 1.88300    ν2 = 40.76
r4 = 2.6388
d4 = 1.9166
r5 = ∞
d5 = 0.5155      n3 = 1.78590    ν3 = 44.18
r6 = ∞
d6 = 0.5826
r7 = −1.5709
d7 = 1.1340      n4 = 1.80610    ν4 = 40.95
r8 = −1.9679
d8 = 0.0014
r9 = ∞   (stop)
d9 = 0.0617
r10 = −7.1548
d10 = 1.3362     n5 = 1.58913    ν5 = 60.97
r11 = −1.3321
d11 = 1.2848     n6 = 1.66998    ν6 = 39.32
r12 = −4.6787
d12 = 1.6630
r13 = 44.0027
d13 = 1.1820     n7 = 1.80610    ν7 = 40.95
r14 = −5.3797
d14 = 0.1542
r15 = 4.3724
d15 = 1.9529     n8 = 1.60311    ν8 = 60.70
r16 = −4.3724
d16 = 0.6167     n9 = 1.80518    ν9 = 25.43
r17 = 7.2658
d27 = 2.5614
r18 = ∞
d18 = 0.7195     n10 = 1.56384   ν10 = 60.69
r19 = ∞
f = 1, F_NO = 2.531, image height 1.0535
P = 1.0000, B = 0, E = 0.13075 × 10^−1
F = 0, G = 0
``` wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{10}$ denote refractive indices of the respective lens elements, and the reference symbols $\nu_1$ through $\nu_{10}$ represent Abbe's numbers of the respective lens elements.

7. An objective lens system for endoscopes according to claim 3 wherein said front lens group comprises a positive meniscus lens component, a cemented doublet, a negative meniscus lens component, a positive lens component and a meniscus lens component, said rear lens group comprises a cemented doublet, a positive lens component, a cemented doublet and a cover glass, and the object side surface of the second cemented doublet as counted from the object side in said front lens group is designed as an aspherical surface, said objective lens system having the following numerical data:

```
r1 = 10.3716
d1 = 0.7992      n1 = 1.88300    ν1 = 40.76
r2 = 17.9820
d2 = 0.0999
r3 = 12.0112   (aspherical surface)
d3 = 0.6993      n2 = 1.49109    ν2 = 57.00
r4 = 4.9950
d4 = 0.3996      n3 = 1.80610    ν3 = 40.95
r5 = 2.4975
d5 = 0.7992
r6 = 19.2639
d6 = 0.3996      n4 = 1.88300    ν4 = 40.76
r7 = 1.9843
d7 = 2.3429
r8 = 15.5038
d8 = 0.5455      n5 = 1.78590    ν5 = 44.18
r9 = −84.2272
d9 = 0.5669
r10 = −1.9200
d10 = 1.0992     n6 = 1.80610    ν6 = 40.95
r11 = −2.3493
d11 = 0.3497
r12 = ∞   (stop)
d12 = 0.0599
r13 = −6.9540
```

-continued

| | | |
|---|---|---|
| $d_{13} = 1.2987$ | $n_7 = 1.58913$ | $\nu_7 = 60.97$ |
| $r_{14} = -1.2947$ | | |
| $d_{14} = 1.2488$ | $n_8 = 1.66998$ | $\nu_8 = 39.32$ |
| $r_{15} = -4.5475$ | | |
| $d_{15} = 1.6164$ | | |
| $r_{16} = 42.7682$ | | |
| $d_{16} = 1.1489$ | $n_9 = 1.80610$ | $\nu_9 = 40.95$ |
| $r_{17} = -5.2288$ | | |
| $d_{17} = 0.1499$ | | |
| $r_{18} = 4.2498$ | | |
| $d_{18} = 1.8981$ | $n_{10} = 1.60311$ | $\nu_{10} = 60.70$ |
| $r_{19} = -4.2498$ | | |
| $d_{19} = 0.5994$ | $n_{11} = 1.80518$ | $\nu_{11} = 25.43$ |
| $r_{20} = 7.0619$ | | |
| $d_{20} = 2.4895$ | | |
| $r_{21} = \infty$ | | |
| $d_{21} = 0.6993$ | $n_{12} = 1.56384$ | $\nu_{12} = 60.69$ |
| $r_{22} = \infty$ | | |
| $f = 1$, $F_{NO} = 2.581$, image height = 1.0240 | | |
| $P = 1.0000$, $B = 0$, $E = 0.92329 \times 10^{-2}$ | | |
| $F = -0.22743 \times 10^{-3}$, $G = 0$ | | | wherein the reference symbols $r_1$ through $r_{22}$ represent radii of curvature on the surfaces of the respective lens elements, the reference symbols $d_1$ through $d_{21}$ designate thicknesses of the respective lens elements and airspaces reserved therebetween, the reference symbols $n_1$ through $n_{12}$ denote refractive indices of the respective lens elements, and the reference symbols $\nu_1$ through $\nu_{12}$ represent Abbe's numbers of the respective lens elements.

8. An objective lens system for endoscopes according to claim 3 wherein said front lens group comprises a positive meniscus lens component, a negative meniscus lens component, a negative meniscus lens component, a meniscus lens component and a meiscus lens component, said rear lens group comprises a cemented doublet, a positive lens component, a cemented doublet and a cover glass, and the object side surface of the second lens component as counted from the object side in said front lens group is designed as an aspherical surface, said objective lens system having the following numerical data:

| | | |
|---|---|---|
| $r_1 = 8.8295$ | | |
| $d_1 = 0.8048$ | $n_1 = 1.88300$ | $\nu_1 = 40.76$ |
| $r_2 = 18.1087$ | | |
| $d_2 = 0.1006$ | | |
| $r_3 = 6.3299$ (aspherical surface) | | |
| $d_3 = 0.6036$ | $n_2 = 1.80610$ | $\nu_2 = 40.95$ |
| $r_4 = 2.4397$ | | |
| $d_4 = 0.9054$ | | |
| $r_5 = 9.6935$ | | |
| $d_5 = 0.4024$ | $n_3 = 1.88300$ | $\nu_3 = 40.76$ |
| $r_6 = 1.8280$ | | |
| $d_6 = 2.4161$ | | |
| $r_7 = 50.2371$ | | |
| $d_7 = 0.5505$ | $n_4 = 1.78590$ | $\nu_4 = 44.18$ |
| $r_8 = 24.9036$ | | |
| $d_8 = 0.5712$ | | |
| $r_9 = -1.9359$ | | |
| $d_9 = 1.1101$ | $n_5 = 1.80610$ | $\nu_5 = 40.95$ |
| $r_{10} = -2.2035$ | | |
| $d_{10} = 0.3521$ | | |
| $r_{11} = \infty$ stop | | |
| $d_{11} = 0.0604$ | | |
| $r_{12} = -7.0030$ | | |
| $d_{12} = 1.3078$ | $n_6 = 1.58913$ | $\nu_6 = 60.97$ |
| $r_{13} = -1.3038$ | | |
| $d_{13} = 1.2575$ | $n_7 = 1.66998$ | $\nu_7 = 39.32$ |
| $r_{14} = -4.5795$ | | |
| $d_{14} = 1.6278$ | | |
| $r_{15} = 43.0694$ | | |
| $d_{15} = 1.1569$ | $n_8 = 1.80610$ | $\nu_8 = 40.95$ |
| $r_{16} = -5.2656$ | | |
| $d_{16} = 0.1509$ | | |
| $r_{17} = 4.2797$ | | |
| $d_{17} = 1.9115$ | $n_9 = 1.60311$ | $\nu_9 = 60.70$ |
| $r_{18} = -4.2797$ | | |
| $d_{18} = 0.6036$ | $n_{10} = 1.80518$ | $\nu_{10} = 25.43$ |
| $r_{19} = 7.1117$ | | |
| $d_{19} = 2.5070$ | | |
| $r_{20} = \infty$ | | |
| $d_{20} = 0.7042$ | $n_{11} = 1.56384$ | $\nu_{11} = 60.69$ |
| $r_{21} = \infty$ | | |
| $f = 1$, $F_{NO} = 2.617$, image height = 1.0312 | | |
| $P = 1.0000$, $B = 0$, $E = 0.86037 \times 10^{-2}$ | | |
| $F = -0.38814 \times 10^{31\ 3}$, $G = -0.27509 \times 10^{-11}$ | | | wherein the reference symbols $r_1$ through $r_2$ represent radii of curvature on the surfaces of the respective lens elements, the reference symbols $d_1$ through $d_{20}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

9. A retrofocus-type objective for endoscopes according to claim 3 wherein factor A further satisfies the following formula when degree of deflection angle K for the principal ray is expressed as $K = A\omega^3 H\sigma$:

$$\frac{2 \times 10^{-6}}{F_{NO}} < A < \frac{3.5 \times 10^{-4}}{F_{NO}}$$

wherein the reference symbol $2\omega$ represents angle of view, the reference symbol H designates correction ratio and $\sigma$ denotes a value of $-1$ when said aspherical surface is arranged on the object side of said lens component.

10. A retrofocus-type objective for endoscopes comprising a front lens group having negative refractive power, a rear lens group having positive refractive power in the order from object side, and a stop arranged between said front and rear lens groups, said front lens group comprising a negative lens element having a concave surface having a selected curvature which is strong and a positive lens element, and said rear lens group having at least two positive lens components, one of said positive lens components being a cemented doublet having a positive lens element and negative lens element the cemented surface of which is convexed to the image side, and at least one of the lens components in sid front lens group having an aspherical surface on the image side thereof including portions whose curvature gradually decreases as the distance thereof decreases from the optical axis.

11. An objective lens system for endoscopes according to claim 10 wherein said aspherical surface is expressed by the following formula when the optical axis is taken as the x axis, and the straight line passing through the top of said aspherical surface and is perpendicular to the x axis is taken as the y axis:

$$x = \frac{Cy^2}{1 + \sqrt{1 - PC^2y^2}} + By^2 + Ey^4 + Fy^6 + Gy^8 \ldots$$

wherein the reference symbol C represents an inverse number of the radius of a circle in contact with said aspherical surface in the vicinity of the optical axis, the reference symbol P designates a parameter representing shape of said aspherical surface, and the reference symbols B, E, F, G, ... denote the second power, fourth power, sixth power, eighth power aspherical surface coefficients respectively.

12. An objective lens system for endoscopes according to claim 11 wherein said system includes a factor A wherein factor A satisfies the following formula when degree of deflection angle K for the principal ray is expressed as $$K = A \cdot \omega^3 \cdot H \cdot \sigma:$$

$$A < \frac{3.5 \times 10^{-4}}{F_{NO}}$$

wherein the reference symbol $2\omega$ represents angle of view, the reference symbol H designates correction ratio and $\sigma$ denotes a value of $+1$ when said aspherical surface is arranged on the image side of said lens component.

13. An objective lens system for endoscopes according to claim 12 wherein said front lens group comprises a negative meniscus lens component, a negative meniscus lens component, a cemented doublet and a meniscus lens component, said rear lens group comprises a cemented doublet, a positive lens component, a cemented doublet aand a cover glass, and the image side surface of the second lens component as counted from the object side in said front lens group is designed as an aspherical surface, said objective lens system having the following numerical data:

$r_1 = 7.0140$
$d_1 = 0.7515$   $n_1 = 1.88300$   $\nu_1 = 40.76$
$r_2 = 3.9221$
$d_2 = 0.8617$
$r_3 = 5.5110$
$d_3 = 0.7014$   $n_2 = 1.49109$   $\nu_2 = 57.00$
$r_4 = 1.5917$   (aspherical surface)
$d_4 = 1.0521$
$r_5 = 4.0080$
$d_5 = 1.1022$   $n_3 = 1.80518$   $\nu_3 = 25.43$
$r_6 = -10018.9980$
$d_6 = 0.4008$   $n_4 = 1.77250$   $\nu_4 = 49.66$
$r_7 = 3.0749$
$d_7 = 3.3019$
$r_8 = -1.4028$
$d_8 = 1.0020$   $n_5 = 1.80610$   $\nu_5 = 40.95$
$r_9 = -1.8511$
$d_9 = 0.3507$
$r_{10} = \infty$   (stop)
$d_{10} = 0.0601$
$r_{11} = -6.9749$
$d_{11} = 1.3026$   $n_6 = 1.58913$   $\nu_6 = 60.97$
$r_{12} = -1.2986$
$d_{12} = 1.2525$   $n_7 = 1.66998$   $\nu_7 = 39.32$
$r_{13} = -4.5611$
$d_{13} = 1.6212$
$r_{14} = 42.8966$
$d_{14} = 1.1523$   $n_8 = 1.80610$   $\nu_8 = 40.95$
$r_{15} = -5.2445$
$d_{15} = 0.1503$
$r_{16} = 4.2625$
$d_{16} = 1.9038$   $n_9 = 1.60311$   $\nu_9 = 60.70$
$r_{17} = -4.2625$
$d_{17} = 0.6012$   $n_{10} = 1.80518$   $\nu_{10} = 25.43$
$r_{18} = 7.0831$
$d_{18} = 2.4970$
$r_{19} = \infty$
$d_{19} = 0.7014$   $n_{11} = 1.56384$   $\nu_{11} = 60.69$
$r_{20} = \infty$
$f = 1, F_{NO} = 2.561$, image height $= 1.02705$
$P = 0, B = 0, E = -0.13727 \times 10^{-2}$
$F = 0.25809 \times 10^{-3}, G = 0$ wherein the reference symbols $r_1$ through $r_{20}$ represent radii of curvature on the surfaces of the respective lens elements, the reference symbols $d_1$ through $d_{19}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

14. An objective lens system for endoscopes according to claim 12 wherein said front lens group comprises a negative meniscus lens component, a negative meniscus lens components, a cemented doublet and a meniscus lens component, said rear lens group comprises a plane parallel plate, a cemented doublet and a cemented doublet, and the image side surface of the second lens component as counted from the object side in said front lens group is designed as an aspherical surface, said objective lens system having the following numerical data:

$r_1 = 7.5512$
$d_1 = 0.8091$   $n_1 = 1.88300$   $\nu_1 = 40.76$
$r_2 = 4.2225$
$d_2 = 0.9277$
$r_3 = 5.9331$
$d_3 = 0.7551$   $n_2 = 1.49109$   $\nu_2 = 57.00$
$r_4 = 1.7136$   (aspherical surface)
$d_4 = 1.1327$
$r_5 = 4.3150$
$d_5 = 1.1866$   $n_3 = 1.80518$   $\nu_3 = 25.43$
$r_6 = -10786.4078$
$d_6 = 0.4315$   $n_4 = 1.77250$   $\nu_4 = 49.66$
$r_7 = 3.3104$
$d_7 = 3.5548$
$r_8 = -1.5102$
$d_8 = 1.0787$   $n_5 = 1.80610$   $\nu_5 = 40.95$
$r_9 = -1.9929$
$d_9 = 0.3776$
$r_{10} = \infty$   (stop)
$d_{10} = 0.7704$   $n_6 = 1.51633$   $\nu_6 = 64.15$
$r_{11} = \infty$
$d_{11} = 1.5410$
$r_{12} = -23.2120$
$d_{12} = 0.6164$   $n_7 = 1.78472$   $\nu_7 = 25.71$
$r_{13} = 7.7327$
$d_{13} = 1.5410$   $n_8 = 1.69680$   $\nu_8 = 55.52$
$r_{14} = -4.6245$
$d_{14} = 0.3082$
$r_{15} = 5.0791$
$d_{15} = 2.0032$   $n_9 = 1.58913$   $\nu_9 = 60.97$
$r_{16} = -3.6013$
$d_{16} = 0.6164$   $n_{10} = 1.78472$   $\nu_{10} = 25.71$
$r_{17} = -7.7928$
$f = 1, F_{NO} = 2.374$, image height $= 1.1057$
$P = 0, B = 0, E = -0.11001 \times 10^{-2}$
$F = 0.17844 \times 10^{-3}, G = 0$ wherein the reference symbols $r_1$ through $r_{17}$ represent radii of curvature on the surfaces of the respective lens elements, the reference symbols $d_1$ through $d_{16}$ designate thicknesses of the respective lens elements and airspaces reserved therebetween, the reference symbols $n_1$ through $n_{10}$ denote refractive indices of the respective lens elements, and the reference symbols $\nu_1$ through $\nu_{10}$ represent Abbe's numbers of the respective lens elements.

15. An objective lens system for endoscopes according to claim 12 wherein said front lens groups comprises a negative meniscus lens component, a negative lens component and a cemented doublet, said rear lens group comprises a cemented doublet, a positive lens component, a cemented doublet and a cover glass, and the image side surface of the second negative lens component as counted from the object side in said front lens group is designed as an aspherical surface, said objective lens system having the following numerical data:

$r_1 = 3.8648$
$d_1 = 0.4533$   $n_1 = 1.88300$   $\nu_1 = 40.76$
$r_2 = 1.7120$
$d_2 = 0.5359$
$r_3 = -261.1516$
$d_3 = 0.4946$   $n_2 = 1.49109$   $\nu_2 = 57.00$
$r_4 = 1.2965$ (aspherical surface)
$d_4 = 2.2278$
$r_5 = 15.9398$
$d_5 = 0.8254$   $n_3 = 1.80518$   $\nu_3 = 25.43$
$r_6 = -2.5723$
$d_6 = 0.3875$   $n_4 = 1.56873$   $\nu_4 = 63.16$
$r_7 = -138.3595$
$d_7 = 0.2887$
$r_8 = \infty$ stop
$d_8 = 0.0495$
$r_9 = -5.7387$
$d_9 = 1.0717$   $n_5 = 1.58913$   $\nu_5 = 60.97$
$r_{10} = -1.0684$
$d_{10} = 1.0305$   $n_6 = 1.66998$   $\nu_6 = 39.32$
$r_{11} = -3.7527$
$d_{11} = 1.3339$
$r_{12} = 35.2935$
$d_{12} = 0.9481$   $n_7 = 1.80610$   $\nu_7 = 40.95$
$r_{13} = -4.3149$
$d_{13} = 0.1237$
$r_{14} = 3.5070$
$d_{14} = 1.5664$   $n_8 = 1.60311$   $\nu_8 = 60.70$
$r_{15} = -3.5070$
$d_{15} = 0.4946$   $n_9 = 1.8-518$   $\nu_9 = 25.43$
$r_{16} = 5.8277$
$d_{16} = 2.0544$
$r_{17} = \infty$
$d_{17} = 0.5771$   $n_{10} = 1.56384$   $\nu_{10} = 60.69$
$r_{18} = \infty$
$f = 1$, $F_{NO} = 3.714$, image height = 0.8450
$P = -4.0000$, $B = 0$, $E = 0$, $F = 0$, $G = 0$ wherein the reference symbols $r_1$ through $r_{18}$ represent radii of curvature on the surfaces of the respective lens elements, the reference symbols $d_1$ through $d_{17}$ designate thicknesses of the respective lens elements and airspaces reserved therebetween, the reference symbols $n_1$ through $n_{10}$ denote refractive indices of the respective lens elements, and the reference symbols $\nu_1$ through $\nu_{10}$ represent Abbe's numbers of the respective lens elements.

16. A retrofocus-type objective for endoscopes according to claim 12 wherein factor A satisfies the following formula when degree of deflection angle K for the principal ray is expressed as $K = A\omega^3 H\sigma$:

$$\frac{2 \times 10^{-6}}{F_{NO}} < A < \frac{3.5 \times 10^{-4}}{F_{NO}}$$

wherein the reference symbol $2\omega$ represents angle of view, the reference symbol H designates correction ratio and $\sigma$ denotes a value of $+1$ when said aspherical surface is arranged on the image side of said lens component.

17. A retrofocus-type objective for endoscopes comprising a front lens group having negative refractive power, a rear lens group having positive refractive power in the order from object side, and a stop arranged between said front and rear lens groups, said front lens group comprising a negative lens element having a concave surface having a selected curvature which is strong and a positive lens element, and said rear lens group having at least two positive lens components, one of said positive lens components being a cemented doublet having a positive lens element and negative lens element the cemented surface of which is convexed to the image side, at least one of the lens components in said front lens group havng an aspherical surface on the object side thereof including portions whose curvature is gradually increased as the distance thereof from the optical axis increases, and at least one of the lens components in said front lens group having an aspherical surface on the image side thereof including portions whose curvature is gradually decreased as the distance thereof from the optical axis increases.

18. An objective lens system for endoscopes according to claim 17 wherein said aspherical surfaces are expressed by the following formula when the optical axis is taken as the x axis, and the straight line passing through the top of said aspherical surface and is perpendicular to the x axis is taken as the y axis:

$$x = \frac{Cy^2}{1 + \sqrt{1 - PC^2y^2}} + By^2 + Ey^4 + Fy^6 + Gy^8 + \ldots$$

wherein the reference symbol C represents an inverse number of the radius of a circle in contact with said aspherical surface in the vicinity of the optical axis, the reference symbol P designates a parameter representing shape of said aspherical surface, and the reference symbols B, E, F, G, . . . denote the second power, fourth power, sixth power, eighth power aspherical surface coefficients respectively and where A is a proportional constant, $2\omega$ is the view angle, H is the distortion correcting ratio and $\alpha = (-1)$.

19. An object lens system for endoscopes according to claim 18 wherein said system includes a factor A and wherein factor A satisfies the following formula when degree of deflection angle K for the principal ray is expressed as $K = A \cdot \omega^3 \cdot H \cdot \sigma$:

$$K = A \cdot \omega^3 \cdot H \cdot \sigma:$$

$$A < \frac{3.5 \times 10^{-4}}{F_{NO}}$$

wherein the reference symbol $2\omega$ represents angle of view, the reference symbol H designates correction ratio and $\sigma$ denotes a value of $-1$ when said aspherical surface is arranged on the object side of said lens component or $+1$ when said aspherical surface is arranged on the image side of said lens component.

20. An objective lens system for endoscopes according to claim 19 wherein said front lens group comprises a negative meniscus lens component, a negative meniscus lens component, a cemented doublet and a meniscus lens component, said rear lens group comprises a cemented doublet, a positive lens component, a cemented doublet and a cover glass, and both surfaces of the second negative meniscus lens component as counted from the object side in said front lens group are respectively designed as aspherical surfaces, said objective lens system having the following numerical data:

$r_1 = 6.1379$
$d_1 = 0.7082$   $n_1 = 1.88300$   $\nu_1 = 40.76$
$r_2 = 2.8682$
$d_2 = 0.9443$
$r_3 = 7.7708$ (aspherical surface)
$d_3 = 0.6610$   $n_2 = 1.49109$   $\nu_2 = 57.00$
$r_4 = 2.4614$ (aspherical surface)
$d_4 = 1.1331$ -continued

| | | |
|---|---|---|
| $r_5 = 9.4429$ | | |
| $d_5 = 0.9943$ | $n_3 = 1.80518$ | $\nu_3 = 25.43$ |
| $r_6 = -9.4429$ | | |
| $d_6 = 0.3777$ | $n_4 = 1.77250$ | $\nu_4 = 49.66$ |
| $r_7 = 7.1863$ | | |
| $d_7 = 2.6440$ | | |
| $r_8 = -1.2695$ | | |
| $d_8 = 0.9443$ | $n_5 = 1.80610$ | $\nu_5 = 40.95$ |
| $r_9 = -1.6981$ | | |
| $d_9 = 0.3305$ | | |
| $r_{10} = \infty$ (stop) | | |
| $d_{10} = 0.0567$ | | |
| $r_{11} = -6.5732$ | | |
| $d_{11} = 1.2276$ | $n_6 = 1.58913$ | $\nu_6 = 60.97$ |
| $r_{12} = -1.2238$ | | |
| $d_{12} = 1.1804$ | $n_7 = 1.66998$ | $\nu_7 = 39.32$ |
| $r_{13} = -4.2984$ | | |
| $d_{13} = 1.5279$ | | |
| $r_{14} = 40.4259$ | | |
| $d_{14} = 1.0859$ | $n_8 = 1.80610$ | $\nu_8 = 40.95$ |
| $r_{15} = -4.9424$ | | |
| $d_{15} = 0.1416$ | | |
| $r_{16} = 4.0170$ | | |
| $d_{16} = 1.7941$ | $n_9 = 1.60311$ | $\nu_9 = 60.70$ |
| $r_{17} = -4.0710$ | | |
| $d_{17} = 0.5666$ | $n_{10} = 1.80518$ | $\nu_{10} = 25.43$ |
| $r_{18} = 6.6752$ | | |
| $d_{18} = 2.3532$ | | |
| $r_{19} = \infty$ | | |
| $d_{19} = 0.6610$ | $n_{11} = 1.6384$ | $\nu_{11} = 60.69$ |
| $r_{20} = \infty$ | | |

$f = 0$, $F_{NO} = 2.543$, image height $= 0.9679$

-continued

| | |
|---|---|
| third surface | $P = 1.0000$, $B = 0$, $E = 0.2254 \times 10^{-2}$ $F = 0.15533 \times 10^{-3}$, $G = 0$ |
| fourth surface | $P = 1.0000$, $B = 0$, $E = -0.95012 \times 10^{-2}$ $F = 0.26639 \times 10^{-2}$, $G = 0$ | wherein the reference symbols $r_1$ through $r_{20}$ represent radii of curvature on the surfaces of the respective lens elements, the reference symbols $d_1$ through $d_{19}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

21. A retrofocus-type objective for endoscopes according to claim 19 wherein factor A satisfies the following formula when degree of deflection angle K for the principal ray is expressed as $K = A\omega^3 H\sigma$:

$$\frac{2 \times 10^{-6}}{F_{NO}} < A < \frac{3.5 \times 10^{-4}}{F_{NO}}$$

wherein the reference symbol $2\omega$ represents angle of view, the reference symbol H designates correction ratio and $\sigma$ denotes a value of $-$when said aspherical surface is arranged on the object side of said lens component or $+1$ when said aspherical surface is arranged on the image side of said lens component.

* * * * *